(12) United States Patent
Weston

(10) Patent No.: US 11,470,819 B2
(45) Date of Patent: Oct. 18, 2022

(54) CLIP FOR PET WASTE BAGS

(71) Applicant: Bryan Weston, Tacoma, WA (US)

(72) Inventor: Bryan Weston, Tacoma, WA (US)

( * ) Notice: Subject to any disclaimer, the term of this patent is extended or adjusted under 35 U.S.C. 154(b) by 612 days.

(21) Appl. No.: 16/539,052

(22) Filed: Aug. 13, 2019

(65) Prior Publication Data

US 2020/0045937 A1 Feb. 13, 2020

Related U.S. Application Data

(60) Provisional application No. 62/717,913, filed on Aug. 13, 2018.

(51) Int. Cl.
*A01K 27/00* (2006.01)
*E01H 1/12* (2006.01)

(52) U.S. Cl.
CPC .... *A01K 27/008* (2013.01); *E01H 2001/1286* (2013.01)

(58) Field of Classification Search
CPC .... A01K 27/008; A01K 27/00; A01K 27/003; A01K 27/004; E01H 2001/1286
See application file for complete search history.

(56) References Cited

U.S. PATENT DOCUMENTS

| | | | | |
|---|---|---|---|---|
| 7,908,716 B2 * | 3/2011 | Sorensen | ............... | F16G 11/14 24/130 |
| 8,113,481 B1 * | 2/2012 | Krysak | ................... | A45F 5/021 D8/367 |
| 8,312,599 B2 | 11/2012 | Vogl et al. | | |
| 8,925,495 B1 * | 1/2015 | Lee | ...................... | E01H 1/1206 119/796 |
| 9,883,664 B2 * | 2/2018 | Bos | ........................ | A01K 91/03 |
| 10,660,412 B2 * | 5/2020 | Breen | ................... | F16G 11/146 |
| 2011/0290188 A1 * | 12/2011 | Lopez | ................. | A01K 27/008 119/72 |

OTHER PUBLICATIONS

Earth Rated Leash Dispenser for Dog Waste Bags; https://bubbly-petz.com/products/earth-rated-green-dog-waste-bag-dispenser-for-leash-includes-15-scented-bags.

The Fifth Paw Leash Attachment Review—Keeping All Paws On Deck!; https://mydoglikes.com/fifth-paw/.

Wouldn't It Be Great To Go For A Walk With Your Dog And Not Have To Carry A Full Bag Of Poop?; https://poopycarrier.com/.

Dog Waste Holder; http://rvalongwithus.com/2017/11/15/dog-waste-holder/.

Progivity Dookie Hookie Dog Poop Hands Free Bag Holder, Strong Stainless Steel, No arping/Breaking/Bending; https://www.amazon.com/ProGivity-Stainless-Warping-Breaking-Bending/dp/B06Y4LQ7XN.

* cited by examiner

*Primary Examiner* — Kristen C Hayes
(74) *Attorney, Agent, or Firm* — Walker Griffin Weitzel; Alloy Patent Law

(57) ABSTRACT

A narrow channel created by one or more channel walls. The channel is engineered with narrow dimensions so as to carry out its function of supporting small bags filled with waste. The channel may be formed as a single body, attached to another body, or formed or incorporated into another body or device, such as, but not limited to, animal leashes, retractable animal leashes, pet waste bag dispensers, pet harnesses, and pooper scoopers. Bags containing animal waste may be inserted into the channel. The bags may be supported by the channel. Additional small bodies including but not limited to rings or cord loops may be inserted into and supported by the channel.

19 Claims, 31 Drawing Sheets

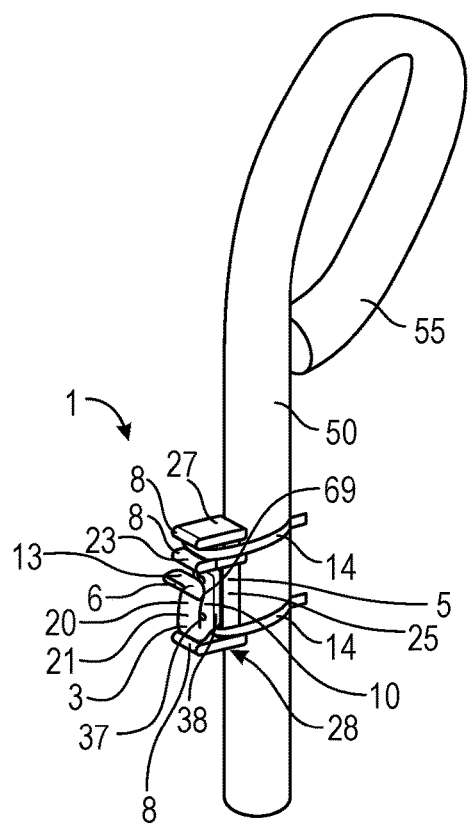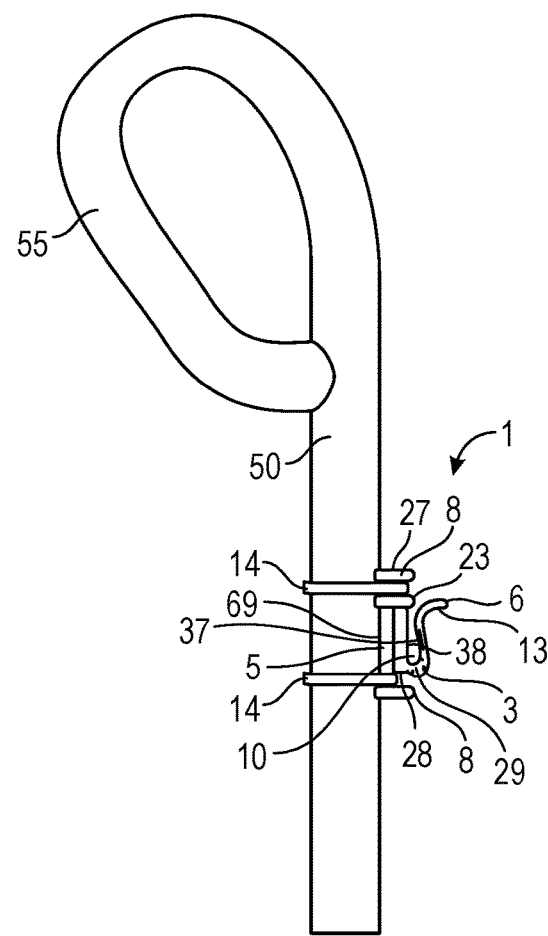
Figure 7
Figure 8

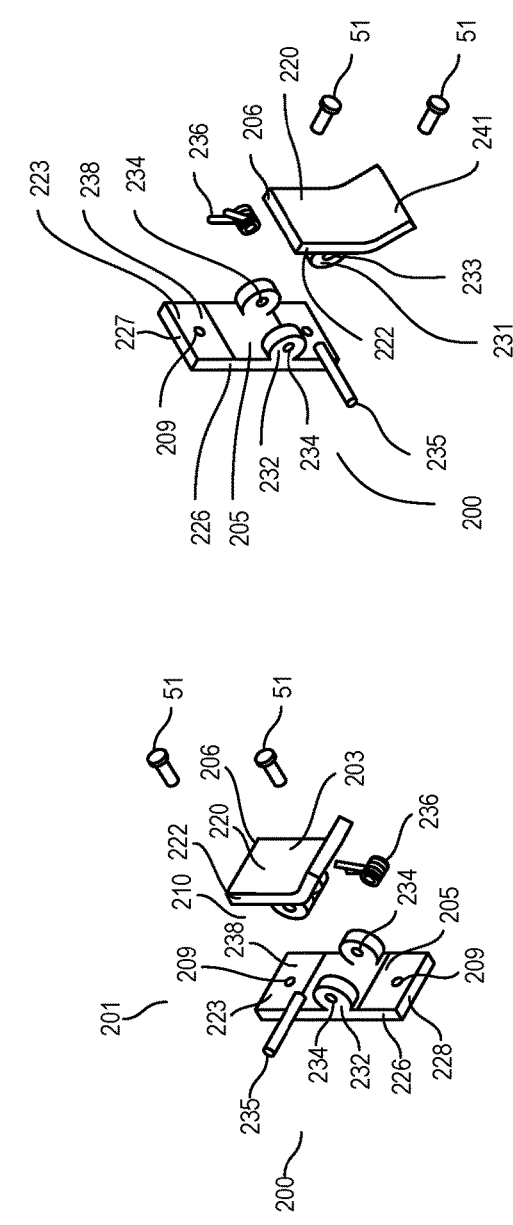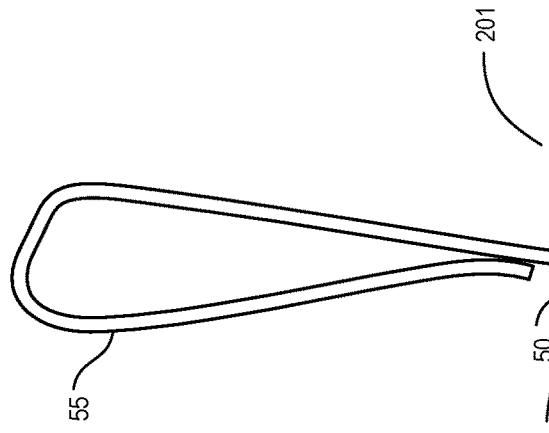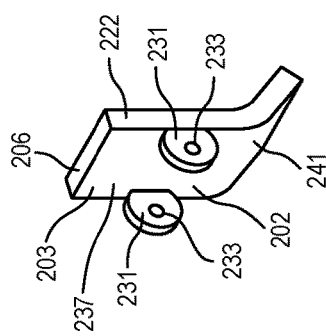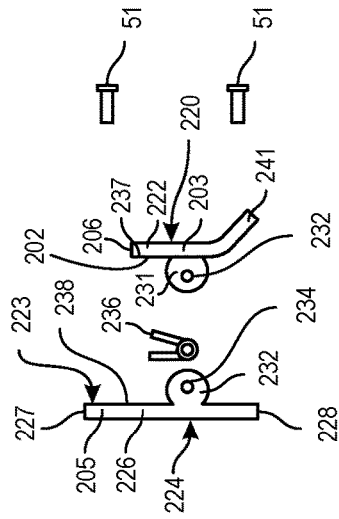

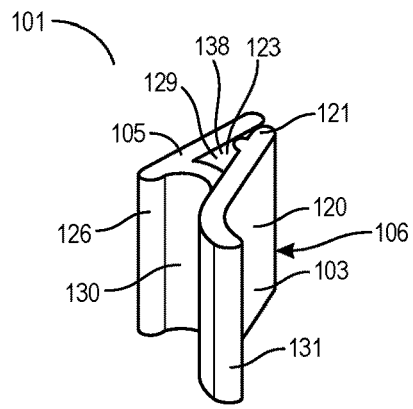 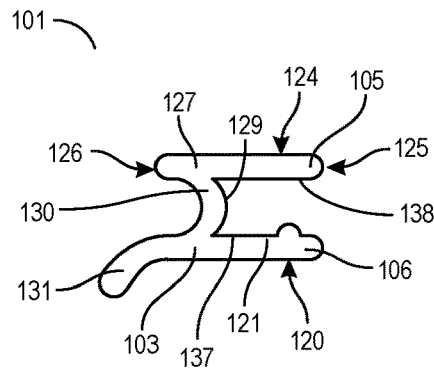
Figure 42    Figure 43
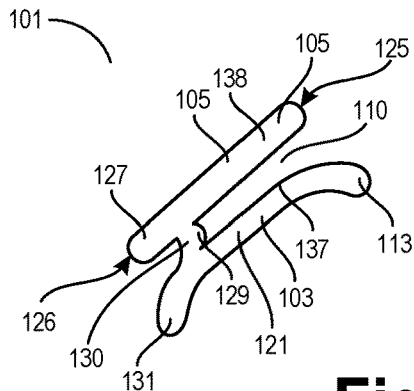
Figure 46
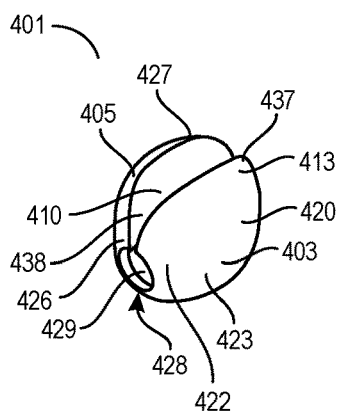 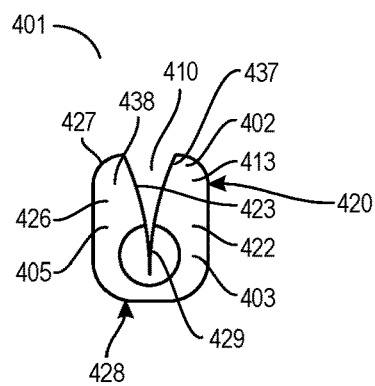
Figure 44    Figure 45

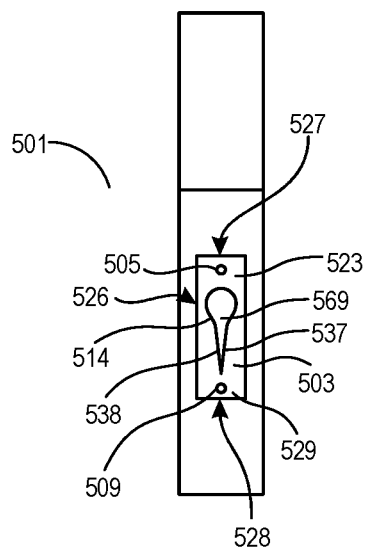 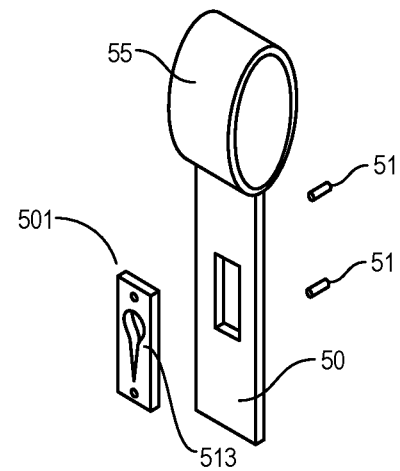
Figure 56  Figure 57
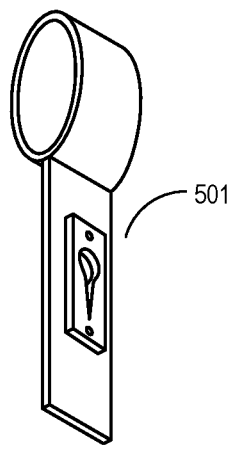 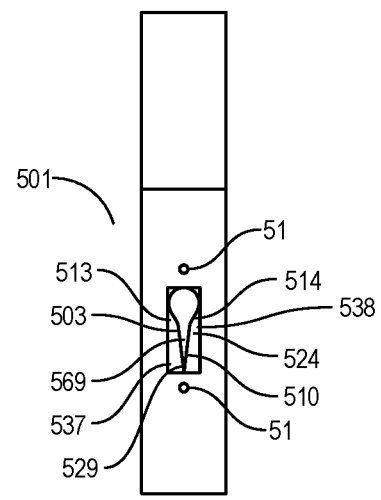
Figure 58  Figure 59

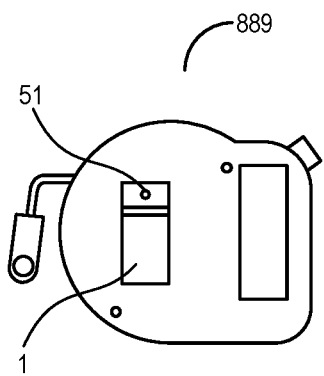
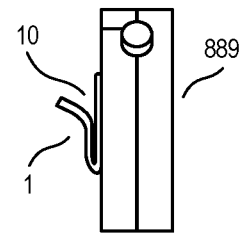
Figure 68
Figure 69
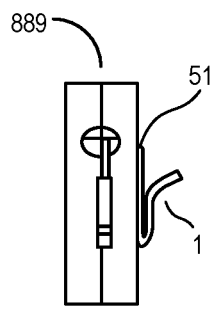
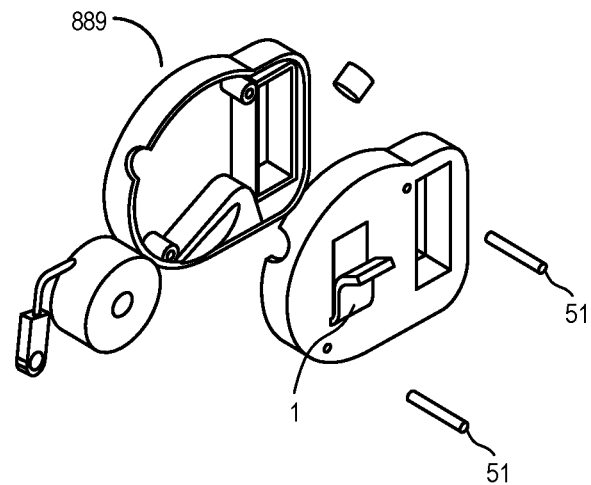
Figure 70
Figure 71

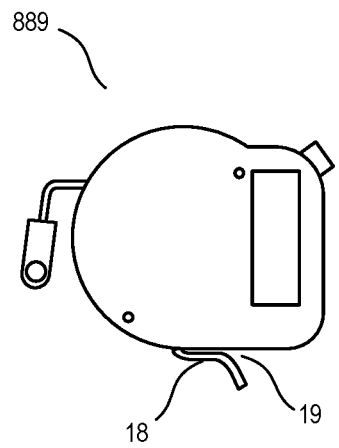
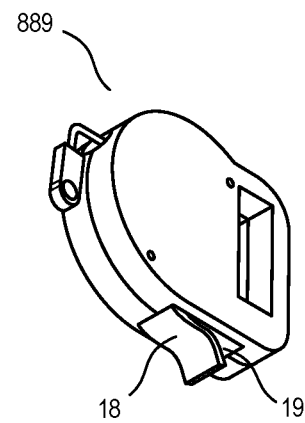
Figure 76      Figure 77
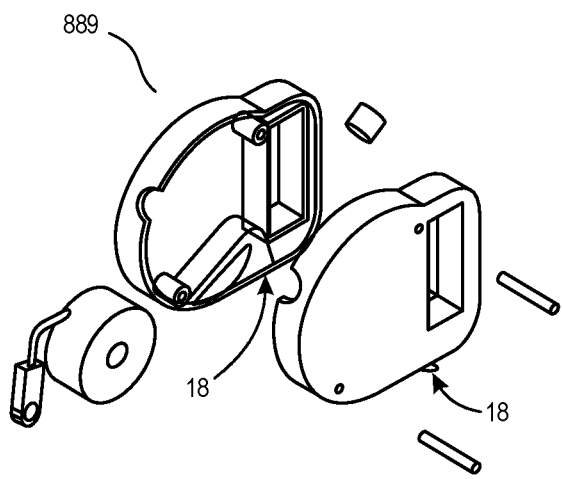
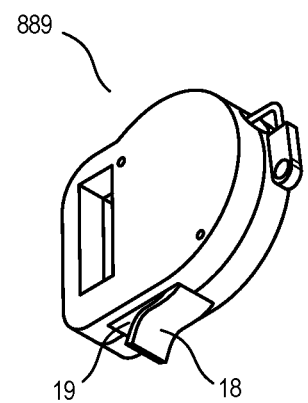
Figure 78      Figure 79

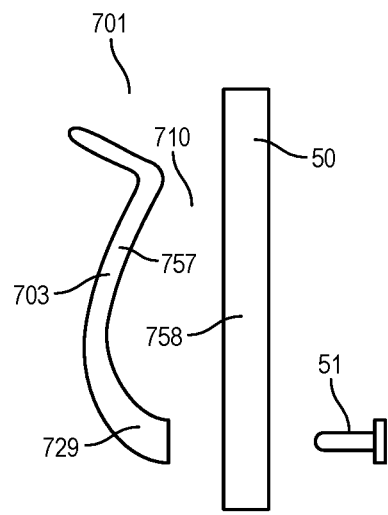
Figure 89
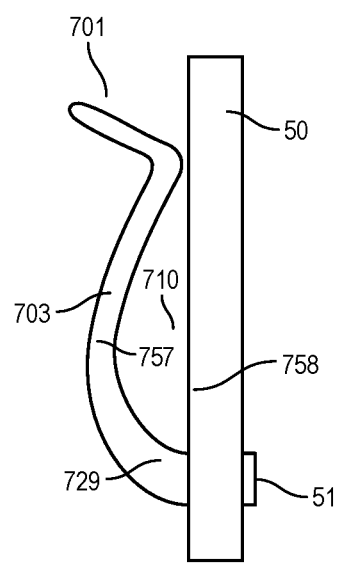 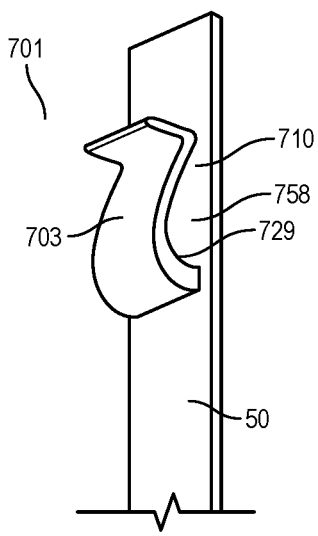
Figure 90 Figure 91

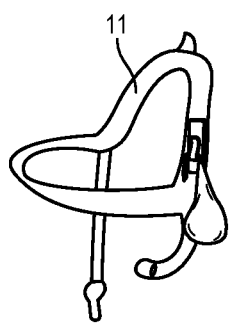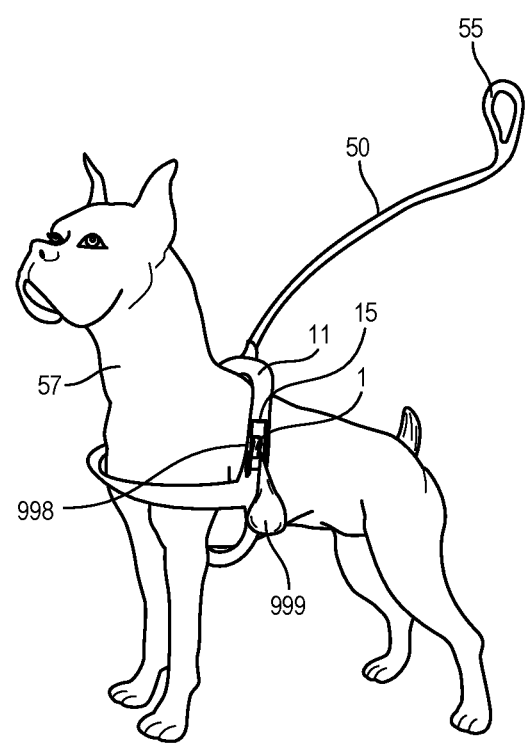
Figure 92
Figure 93

CLIP FOR PET WASTE BAGS

CROSS-REFERENCE TO RELATED PATENT DOCUMENTS

This patent application claims the benefit of priority of U.S. Provisional Application No. (62/717,913), entitled "CLIP FOR PET WASTE BAGS," filed Aug. 13, 2018, which are hereby incorporated herein by reference in its entirety.

FIELD OF THE INVENTION

The present invention relates in general to clip devices for pet animals, and, more particularly, to the clip devices that are used to secure waste filled bags to other pet accessories including, but are not limited to, pet leashes, retractable leashes, pet waste bag dispensers, pet harnesses, and pooper scoopers.

BACKGROUND OF THE INVENTION

Animal handling and pet ownership can be a pleasurable and enjoyable life experience. However, one of the lesser desirable tasks associated with the experience is handling and managing the animals waste, including bags filled with feces.

The task of managing animal waste may prove particularly difficult when animal and handler are in a state of travel, such as walking. In such a state, the handler may have limited available resources with which to implore the collection, containment, and disposal of the animal waste. The present invention is not so much concerned with the collection of the animal waste, but more so with the transportation of the pet waste between containment and disposal. There exists in the prior art area for improvement in how one may select to transport waste filled bags.

Handlers, pet owners and pets often walk together for exercise, mobility, or simply for the animal to relieve themselves of urine and feces. A common solution for dealing with the feces is for a handler to place a plastic bag over their hand and then grasp or scoop up the fecal material. The handler often ties the bag to close it. If there is a garbage bin nearby, then the handler may dispose of the waste filled bag accordingly. However, if the handler and pet are walking in an area where no such garbage bin is available, then the handler will often elect to carry the waste filled bag in their hand. This may occupy both of the handler's hands as the other hand may be employed in handling the animal leash. Additionally, the prospect of holding a waste filled bag in one's hand is appalling. There may exist a potential for waste contamination on the handler's hand. Carrying the waste filled bag by hand is a common method currently employed by the pet owners such as dog handlers.

Another potential solution employed in the prior art is that the pet handler places the waste filled bag in another bag and carry both. While this may limit the handler's direct handling of the waste filled bag, it may not free up their hand. It may require, use, and waste additional bags. A need exists for a device to allow a pet owner to easily transport a filled pet waste bag without the need to use his hand to grasp and carry the bag.

BRIEF SUMMARY OF THE INVENTION

The present invention seeks to offer a better solution to how animal waste filled bags are transported between a waste collection and containment phase and a disposal phase of pet waste management. The present invention solves the problem of carrying bags filled with animal waste such as pet waste bags. The invention offers a solution in which a user may clip the bag in place to a clip, a leash, or a handle, thus negating the need to physically carry a bag full of animal feces. This is a cleaner and more appealing solution to the problem of carrying the bags filled with pet waste.

In an embodiment, the present invention discloses a clip that's primary purpose and function is to support a waste filled bag, such as a small bag filled with animal feces. The clip may be formed into or attached to another apparatus, such as, but is not limited to, a pet leash, a pet leash handle, a retractable leash, a waste bag dispenser, an animal harness, a poop scooper device, and various other straps, handles, and accessories.

In an embodiment, the present invention further discloses a narrow channel comprising two or more channel wall portions that are narrowly spaced so as to permit a small knotted bag to be inserted into the channel, and sufficiently narrow so that the bag could not be easily slid out of the channel. The channel may be formed by one or more bodies. The channel may be formed into or attached to another apparatus, such as, but is not limited to, an animal leash, a retractable animal leash, a pet waste bag dispenser, an animal harness, a pooper scooper device, and various handles.

In an embodiment, the primary function of the clip and the clip channel is to support a small knotted bag that may contain pet waste. The user may place a knotted waste filled bag into the clip channel so that the bag may be supported by the clip. If the clip is attached or formed into a leash or leash handle, then the user may handle the animal via the leash while the waste filled bag may be supported by the clip and leash.

Further, when the user gets close to a waste bin, the user may remove the waste filled bag from the clip channel and dispose of the waste filled bag. The present invention offers a better solution to secure the waste filled bags to the clip for transportation. This solution may limit the user's manual contact and need to manually carry such waste filled bags.

Although the primary function of the devices (i.e., the clip and the clip channel) is to hold, support, and assist with the transportation of the bags containing animal waste, such devices may also be used to hang other devices and apparatus particularly via small or narrow diameter attachment objects such as rings or loops of cord. Other devices that may attach or hang from the devices (i.e., the clip and the clip channel) of the present invention include, but are not limited to, pet waste bag dispensers, pooper scooper devices, flashlights, and small bags.

The underlying heart and soul of the present invention is the creation of a narrow bag channel engineered for the purpose and function of securing the pet waste filled bags so that they may be transported without the user needing to physically carry the pet waste filled bags.

These and other advantages and features of the present invention are described herein with specificity so as to make the present invention understandable to one of ordinary skill in the art, both with respect to how to practice the present invention and how to make the present invention.

BRIEF DESCRIPTION OF THE SEVERAL VIEWS OF THE DRAWINGS

Elements in the figures have not necessarily been drawn to scale in order to enhance their clarity and improve understanding of these various elements and embodiments of the present invention. Furthermore, elements that are known to be common and well understood to those in the industry are not depicted in order to provide a clear view of the various embodiments of the invention.

The novel features which are believed to be characteristic of the present invention, as to its structure, organization, use, and method of operation, together with further objectives and advantages thereof, will be better understood from the following drawings in which a presently preferred embodiment of the invention will now be illustrated by way of various examples. It is expressly understood, however, that the drawings are for the purpose of illustration and description only and are not intended as a definition of the limits of the invention. Embodiments of this invention will now be described by way of example in association with the accompanying drawings in which:

FIG. 7 depicts a front left view of a version of the clip (1) attached with straps (14) to the animal leash 50, according to an exemplary embodiment of the present invention.

FIG. 8 depicts a right view of a version of the clip (1) attached with the straps (14) to the animal leash (50), according to an exemplary embodiment of the present invention.

FIG. 31 depicts a bottom, front, and right exploded view of the hinge clip (201), according to an exemplary embodiment of the present invention.

FIG. 32 depicts a top, front, and right exploded view of the hinge clip (201), according to an exemplary embodiment of the present invention.

FIG. 33 depicts a right lateral exploded view of the hinge clip (201), according to an exemplary embodiment of the present invention.

FIG. 34 depicts a right lateral view of the hinge clip (201) attached to the animal leash (50), according to an exemplary embodiment of the present invention.

FIG. 35 depicts a top, back, and right view of a body (203), according to an exemplary embodiment of the present invention.

FIG. 42 depicts a top, front, and left view of the living hinge clip (101) in a closed position, according to an exemplary embodiment of the present invention.

FIG. 43 depicts a top view of the living hinge clip (101), according to an exemplary embodiment of the present invention.

FIG. 44 depicts a top, front, and right view illustrating a bulky body (401) embodiment, according to an exemplary embodiment of the present invention.

FIG. 45 depicts a left lateral view illustrating the bulk body embodiment (401), according to an exemplary embodiment of the present invention.

FIG. 46 depicts a top view of the living hinge clip (101) with a channel guide (113) portion of a body (103), according to an exemplary embodiment of the present invention.

FIG. 56 depicts a frontal view illustrating an embedded version (501) attached to the animal leash (50), according to an exemplary embodiment of the present invention.

FIG. 57 depicts a front, top, and left view illustrating an exploded view of the embedded version (501), the animal leash (50), and the fasteners (51), according to an exemplary embodiment of the present invention.

FIG. 58 depicts a front, bottom, and right view illustrating the embedded version (501) embodiment attached to the animal leash (50), according to an exemplary embodiment of the present invention.

FIG. 59 depicts a back view illustrating the embedded version (501) embodiment attached to the animal leash (50), according to an exemplary embodiment of the present invention.

FIG. 68 depicts a left lateral view of the clip (1) attached to a retractable leash (889), according to an exemplary embodiment of the present invention.

FIG. 69 depicts a back view of the clip (1) attached to the retractable leash (889), according to an exemplary embodiment of the present invention.

FIG. 70 depicts a front view of the clip (1) attached to the retractable leash (889), according to an exemplary embodiment of the present invention.

FIG. 71 depicts a top, front, and left view of the clip (1) attached to the retractable leash (889), according to an exemplary embodiment of the present invention.

FIG. 76 depicts a left lateral view of the retractable leash (889) with a clip (18) and a clip channel (19), according to an exemplary embodiment of the present invention.

FIG. 77 depicts a bottom, front, and left view of the retractable leash (889) with the clip (18) and the clip channel (19), according to an exemplary embodiment of the present invention.

FIG. 78 depicts a top, front, and left exploded view of the retractable leash (889) with the clip (18) and the clip channel (19), according to an exemplary embodiment of the present invention.

FIG. 79 depicts a bottom, front, and right view of the retractable leash (889) with the clip (18) and the clip channel (19), according to an exemplary embodiment of the present invention.

FIG. 89 depicts an exploded left lateral view of a clip (701), the animal leash (50), and the fasteners (51), according to an exemplary embodiment of the present invention.

FIG. 90 depicts a left lateral view of the clip (701) attached to the animal leash (50) via the fasteners (51), according to an exemplary embodiment of the present invention.

FIG. 91 depicts a top, front, and left view of the clip (701) attached to the animal leash (50), according to an exemplary embodiment of the present invention.

FIG. 92 depicts an example of a dog harness (11), according to an exemplary embodiment of the present invention.

FIG. 93 depicts a left lateral view of the clip (1) attached to the dog harness (11) with the overlay (15), according to an exemplary embodiment of the present invention. Dog harness (11) is attached to dog (57). A waste filled bag (999) is supported by clip (1). Leash (50) is attached to dog harness (11).

DETAILED DESCRIPTION OF THE INVENTION

Figure 1:
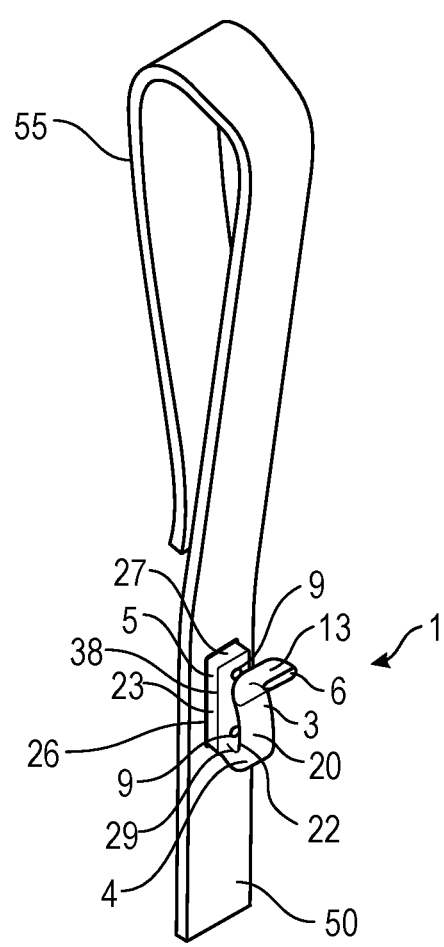
FIG. 1 depicts a front, top, and right view of a clip (1) attached to an animal leash (50), according to an exemplary embodiment of the present invention.

Certain terminology is used in the following description for reference only and is not limiting. The words "front," "rear," "anterior," "posterior," "lateral," "medial," "upper," "lower," "outer," "inner," and "interior" refer to directions toward and away from, respectively, the geometric center of the invention, and designated parts thereof, in accordance with the present disclosure. Unless specifically set forth herein, the terms "a," "an," and "the" are not limited to one element, but instead should be read as meaning "at least one." The terminology includes the words noted above, derivatives thereof, and words of similar import.

As contemplated by the present invention, a primary objective of the disclosure is to facilitate clip devices for pet animals that are used to secure waste filled bags to other pet accessories including, but are not limited to, pet leashes, retractable leashes, pet waste bag dispensers, pet harnesses, and pooper scoopers.

Before describing the present invention in detail, it should be observed that the present invention utilizes a combination of components, which constitutes the clip devices that are used for transporting the waste filled bags between a waste collection and containment phase and a disposal phase of pet waste management. The present invention solves the problem of carrying bags filled with animal waste such as pet waste bags. The present invention offers a solution in which a user may clip the bag in place to a clip, a leash, or a handle, thus negating the need to physically carry a bag full of animal feces. This is a cleaner and more appealing solution to the problem of carrying the bags filled with pet waste. Accordingly, the components have been represented, showing only specific details that are pertinent for an understanding of the present invention so as not to obscure the disclosure with details that may be readily apparent to those with ordinary skill in the art having the benefit of the description herein. As required, the detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

References to "one embodiment", "an embodiment", "another embodiment", "yet another embodiment", "one example", "an example", "another example", "yet another example", and so on, indicate that the embodiment(s) or example(s) so described may include a particular feature, structure, characteristic, property, element, or limitation, but that not every embodiment or example necessarily includes that particular feature, structure, characteristic, property, element, or limitation. Furthermore, repeated use of the phrase "in an embodiment" does not necessarily refer to the same embodiment.

The words "comprising", "having", "containing", and "including", and other forms thereof, are intended to be equivalent in meaning and be open ended in that an item or items following any one of these words is not meant to be an exhaustive listing of such item or items or meant to be limited to only the listed item or items.

Unless stated otherwise, terms such as "first" and "second" are used to arbitrarily distinguish between the elements or entities. Thus, these terms are not necessarily intended to indicate temporal or other prioritization of such elements or priorities. While various exemplary embodiments of the disclosed devices have been described below, it should be understood that they have been presented for purposes of example only, and not limitations. It is not exhaustive and does not limit the invention to the precise form disclosed. Modifications and variations are possible in light of the above teachings or may be acquired from practicing of the invention, without departing from the breadth or scope.

The clip devices for pet animals of the present invention will now be described with reference to the accompanying drawings, which should be regarded as merely illustrative without restricting the scope and ambit of the present invention.

The underlying heart and soul of the present invention is the creation of a narrow bag channel engineered for the purpose and function of securing a pet waste bag so that it may be transported without a user needing to physically carry the pet waste bag. The present invention discloses a narrow channel comprising two or more channel wall portions narrowly spaced so as to permit a small knotted bag to be inserted into the channel, and sufficiently narrow so that the bag may not easily slid out of the channel. The channel may be formed by one or more bodies. The channel may be formed into or attached to another apparatus such as, but is not limited to, an animal leash, a retractable animal leash, a pet waste bag dispenser, an animal harness, a pooper scooper device, and various handles.

The preferred embodiment of the clip (1) describes and depicts the narrow clip channel (10) in a simple form comprising a single body that may be attached to a variety of other devices including, but are not limited to, leashes (50), and retractable leashes. However, as described and depicted in other embodiments, the present invention may easily be formed into the body of a variety of other apparatus including, but is not limited to, leashes, leash handles, and bag dispensers.

The preferred embodiment of the present invention is the clip (1). The clip (1) may comprises one or more bodies that may be attached to, embedded into, created with, affixed to, secured to, wrapped around, or hung from a leash. FIG. 1 depicts the clip (1) attached to the leash (50).

The clip (1) comprises the clip channel (10) formed by at least a channel wall portion (37) and a channel wall portion (38). The primary function of the hinge clip (1) is to support one or more waste filled bags (such as the waste filled bag (999)), a ring, or a cord.

One preferred embodiment of the clip (1) is depicted in FIG. 21, FIG. 22, FIG. 23, and FIG. 24. The clip (1) may comprise one or more clip channels (such as the clip channel (10)), a body (3), and a base (5).

The body (3) or the base (5) may arise from, or may be integrated into the wall or body of another structure or apparatus, such as, but is not limited to, a handle.

Figure 21:
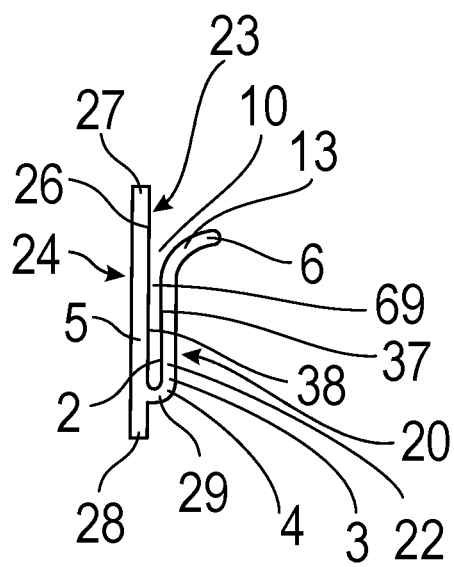
FIG. 21 depicts the clip (1) from a left lateral view, according to an exemplary embodiment of the present invention.
Figure 22:
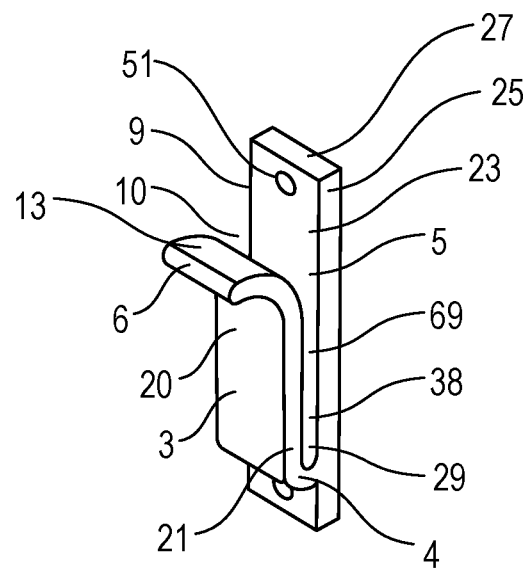
FIG. 22 depicts the clip (1) from a top, front, and left view, according to an exemplary embodiment of the present invention.

FIG. 21 depicts a left lateral view of the clip (1), FIG. 22 depicts the clip (1) from a top, front, and left view. The base (5) portion may comprise a rectangular shaped body with a front of base (23), a back of base (24), a left lateral portion of base (25), a right lateral portion of base (26), a first end of base (27), and a second end of base (28).

Figure 24:
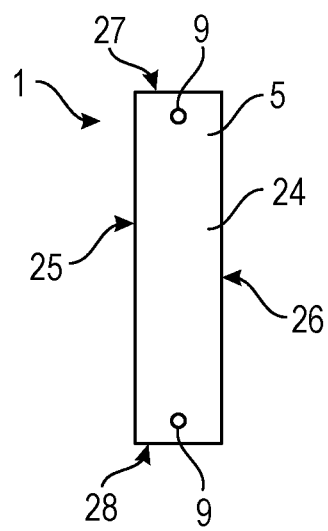
FIG. 24 depicts the clip (1) from a back view, according to an exemplary embodiment of the present invention.

FIG. 24 depicts the back of base (24) with securing holes (9) near the end of base (27) and near the end of base (28). The securing holes (9) may be of small diameter to permit securing fasteners (51) to or through them.

Figure 2:
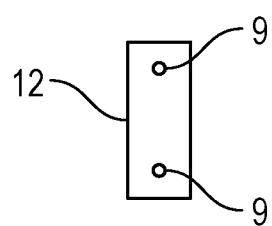
FIG. 2 depicts a front view of a securing plate (12), according to an exemplary embodiment of the present invention.
Figure 18:
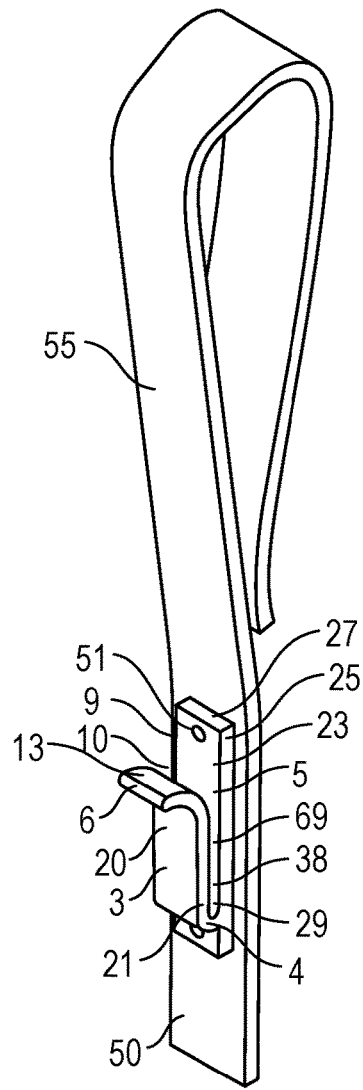
FIG. 18 depicts a front, top, and right view of the flat clip (1) attached to the animal leash (50), according to an exemplary embodiment of the present invention.
Figure 19:
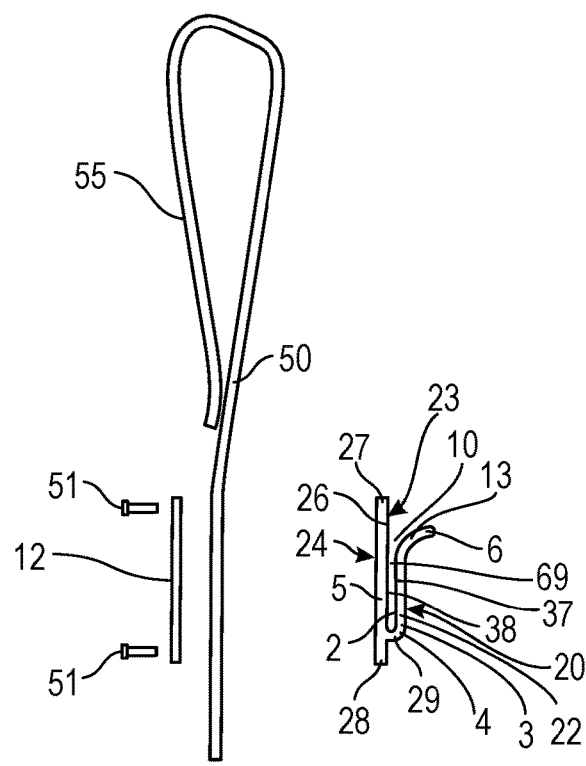
FIG. 19 depicts a right lateral exploded view of the clip (1), the securing plate (12), fasteners (51), and the animal leash (50), according to an exemplary embodiment of the present invention.

FIG. 19 depicts a right lateral exploded view of the clip (1), the securing plate (12), the fasteners (51), and the leash (50). The fasteners (51) in the depicted embodiment may include, but are not limited to, screws, pins, or rivets. The fasteners (51) may attach through or to the holes in the securing plate (12) and the clip (1), and through the leash (50) so that all components may be connected and secured together. FIG. 18 depicts the clip (1) attached to the leash (50). The securing plate (12) is depicted in a front view in FIG. 2.

FIG. 21 depicts the base to body transition zone (4) as a short curved section of the clip (1) extending from the front of base (23) to the body (3). As depicted in FIG. 22, the base to body transition zone (4) may be of similar width to the base (5) and the body (3). The base to body transition zone (4) may be correspond to other shapes in other embodiments such as the living hinge clip (101) embodiment. The base to body transition zone (4) may be significantly small.

Figure 3:
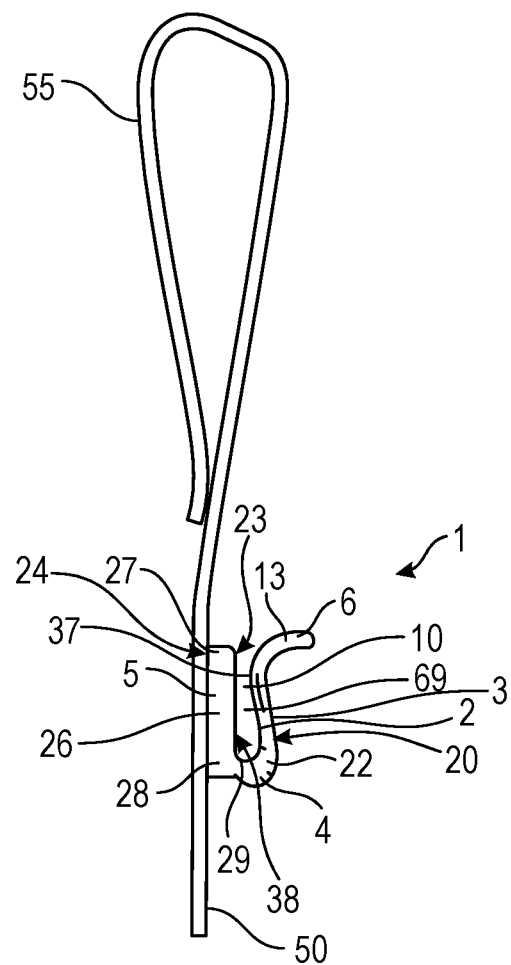
FIG. 3 depicts a right lateral view of the clip (1) attached to the animal leash (50), according to an exemplary embodiment of the present invention.
Figure 4:
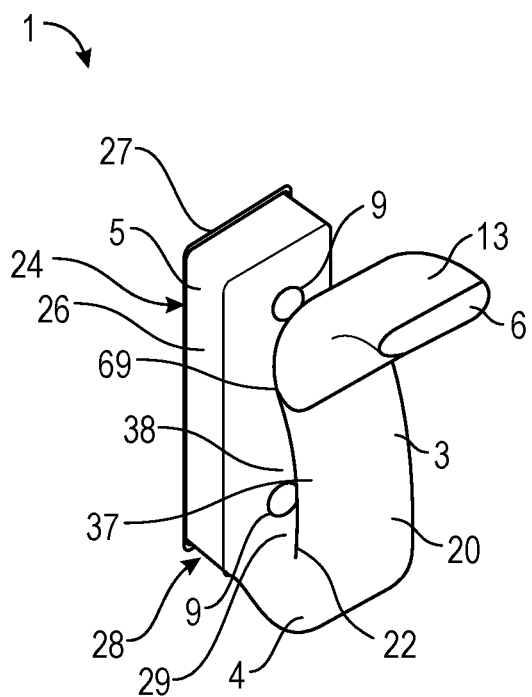
FIG. 4 depicts a front, top, and right view of the clip (1), according to an exemplary embodiment of the present invention.
Figure 6:
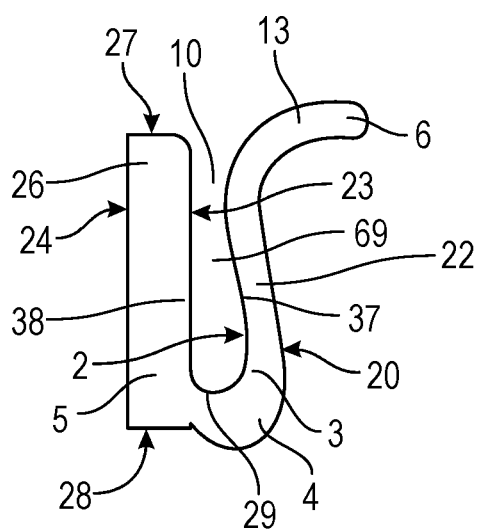
FIG. 6 depicts a right lateral view of the clip (1), according to an exemplary embodiment of the present invention.
Figure 5:
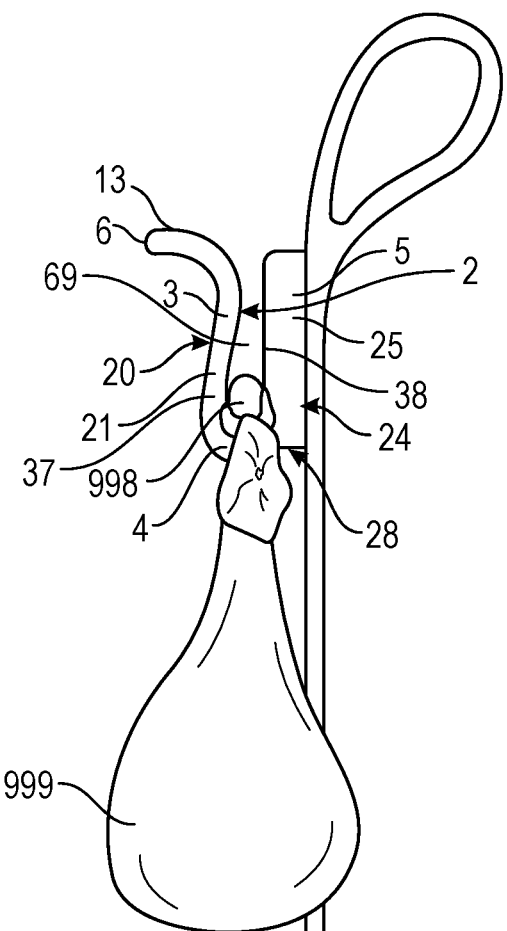
FIG. 5 depicts a left lateral view of the clip (1) attached to the animal leash (50) and supporting a waste filled bag (999) in a clip channel (10), according to an exemplary embodiment of the present invention.
Figure 23:
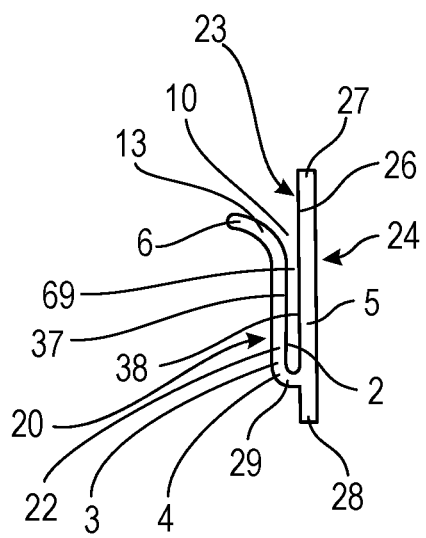
FIG. 23 depicts the clip (1) from a right lateral view, according to an exemplary embodiment of the present invention.

As depicted in FIG. 21, an end of channel (29) may be present on the clip channel (10) side of the base to body transition zone (4). As depicted in FIG. 23, the body (3) may comprise an elongated portion extending between the base to body transition zone (4) and the channel guide (13) portion of the clip (1). The channel guide (13) is also depicted in FIG. 4. The body (3) in this embodiment is flat, narrow, and elongated structure that may be somewhat rectangularly shaped from a front view, but could be of a variety of shapes. The body (3) may be slightly curved when viewed from a lateral perspective as depicted in FIG. 3, FIG. 5, and FIG. 6 which are depicted with the curved body (3) as viewed from a lateral view.

The body (3) may be comprised of a first lateral portion of body (21) or left side, a second lateral portion of body (22) or right side, a back portion of body (2), and a front of body (20). The back portion of body (2) may help form the channel wall portion (37) that partially forms the boundary of the clip channel (10).

The body (3) may transition into the channel guide (13) portion towards the terminal end (6) of the clip (1). As depicted in FIG. 21 and FIG. 23, the channel guide (13)

comprises a curved section of similar profile to the body (3) that may curve away from the clip channel (10) and the base (5). The channel guide (13) may be an extension of the body (3) and the surfaces may transition smoothly between the two portions. The channel guide (13) may curve away from the base (5) so as to create a wider opening into the clip channel (10) so that another body such as the bag (900) may be inserted into the clip channel (10). The body (3) may terminate in the end (6) without the channel guide (13) portion. In such embodiments, the end (6) may be in line with the body (3).

In an embodiment, the back portion of body (2) may comprise the channel wall portion (37). The channel wall portion (38) may be present on the front of base (23). The channel wall portion (37) and the channel wall portion (38) may form the clip channel (10).

The clip channel (10) may be of a short length sufficient to support a variety of gathered portion of bags (900) or a few rings. The internal separation distance of the clip channel (10) is a distance between adjacent bodies that form the clip channel (10). The internal separation distance may vary depending on the overall purpose of the clip (1). In the preferred embodiment, the internal separation distance may be narrow enough to permit a small knotted waste filled bag (999) to be inserted into the clip channel (10), and narrow enough so that the waste filled bag (999) may not be easily pulled out from lateral openings (69) of the clip channel (10). The internal separation distance in this embodiment may be less than the diameter of the loosely tied knot in a waste filled bag (999). The internal separation distance can be viewed in FIG. 21 from the lateral perspective as the distance directly across the clip channel (10) from the channel wall portion (37) to the channel wall portion (38). The clip channel (10) may have an opening distance of separation described as the greatest distance of separation near the opening to the clip channel (10), perhaps the distance from end (6) to front of base (23). The clip (1) and the clip channel (10) are illustrated and depicted in FIG. 6.

The lateral opening (69) or the lateral openings (69) are openings along the length of the clip channel (10). The length of the clip channel (10) may be described as a vertical distance between the level of the widest part of the opening which may coincide with the end (6), and the end of channel (29).

The base (5) may be a unique feature of the clip (1), an extension of the body (3), or it may be a separate structure or body. The base (5) may help facilitate connection with another structure or body such as the leash (50). The base (5) and/or the body (3) may be formed into a second structure including, but is not limited to, a handle, a tube body, or a pooper scooper. The base (5) and the body (3) may be of different size. In some embodiments, the base (5) may be wider and longer to facilitate connection to another structure such as the leash (50). The base (5) and the body (3) may comprise one or more bodies.

The securing holes (9) may be present in the base (5) or any portion of the clip (1). The securing holes (9) may be of sufficient size to allow the fasteners (51) to secure the clip (1) to another body. The fasteners (51) may include, but are not limited to, screws, pins, rivets, needle and thread, tabs, and a variety of securing methods.

Figure 26:
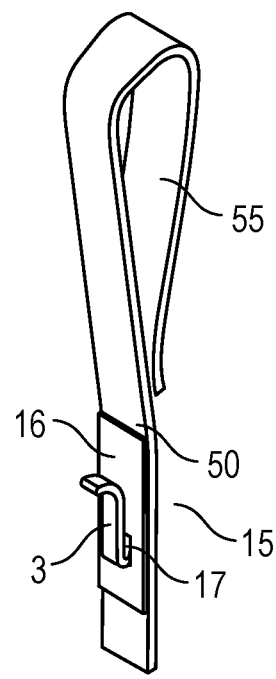
FIG. 26 depicts a top, front, and left view of the clip (1) attached to the animal leash (50) via the overlay (15), according to an exemplary embodiment of the present invention.
Figure 27:
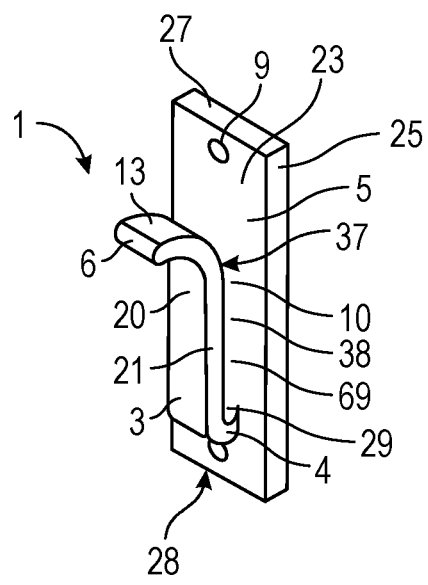
FIG. 27 depicts a top, front, and right view of the clip (1), according to an exemplary embodiment of the present invention.
Figure 28:
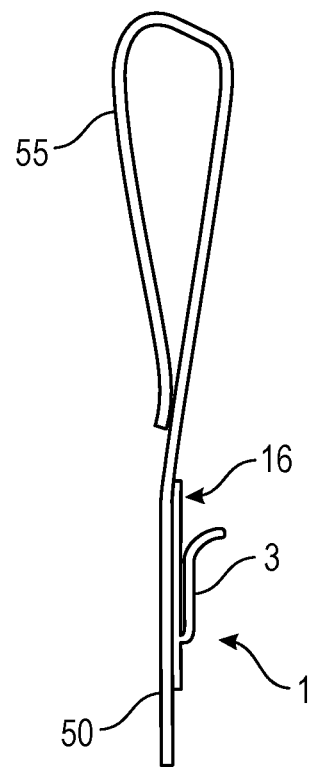
FIG. 28 depicts a right view of the clip (1) attached to the animal leash (50) via the overlay (15), according to an exemplary embodiment of the present invention.

The overlay (15) may be used to attach any of the clip (1) embodiments described to another surface or structure including, but is not limited to, the leash (50). The overlay (15) may comprise an overlay body (16) which may further comprise at least an overlay relief (17). The clip (1) is depicted in FIG. 26 and FIG. 28 attached to the leash (50) via the overlay body (16). FIG. 27 depicts the clip (1).

The overlay (15) may be made of a variety of materials including fabric like materials and textiles, such as nylon straps or rope, as well as plastics such as thermoplastics, or metals. In some embodiments in which the overlay (15) is a fabric like material, it may be sewn into place. The overlay body (16) may be formed by a portion of the structure to which it is attaching, such as part of the leash (50).

Figure 25:
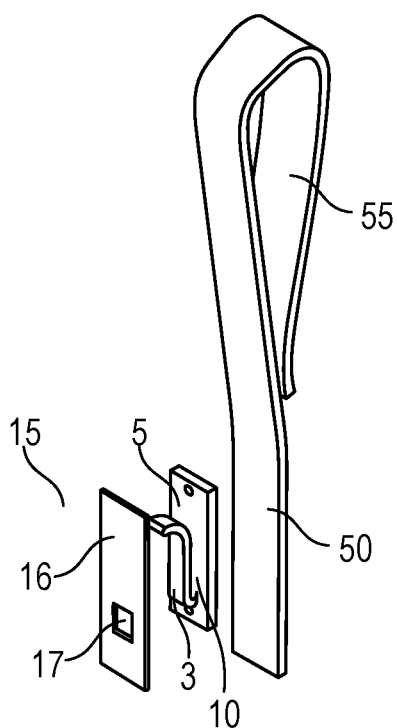
FIG. 25 depicts a top, front, and left exploded view of the clip (1), the animal leash (50), and an overlay (15), according to an exemplary embodiment of the present invention.

The overlay relief (17) is depicted in FIG. 25 as a hole or a relief area in the overlay body (16) of sufficient size so that the body (3) of the clip (1) may be inserted and permitted to pass through it. It may be of small enough size to restrict the base (5) to pass through, particularly after the overlay (15) is secured in place. The overlay body (16) may be fastened to another object such as the leash (50) or the harness. The body (3) may protrude through the overlay relief (17) area of the overlay (15).

In an embodiment, the clip (1) may be connected to another structure or object via a securing device that wraps around and secures the clip (1) to other device. Examples may include, but are not limited to, cords, zip ties, Velcro, bands, clips, and various fabric materials.

The present invention including, but not limited to, the clip (1) embodiment or any of the embodiments describe here may be attached or fastened to a second structure via the fasteners (51), such as, but are not limited to, screws or rivets.

The present invention including, but not limited to, the clip (1) embodiment or any of the embodiments describe here may be attached or fastened to a second structure including, but not limited to, the leash (50) via an adhesive material that may be selected by one skilled in the art. The adhesive material may include various glues or adhesives.

The securing plate (12) may be used in conjunction with any of the embodiments including, but not limited to, the clip (1). The securing plate (12) may have one or more holes or posts that permit the fastener (51) or a securing material to pass through and attach. The securing plate (12) may be made of a variety of materials, such as, but are not limited to, hard durable plastics, thermoplastics, metals, and metal alloys. The securing plate (12) may be designed in a variety of shapes including, but are not limited to, rectangular or square shapes. It may have a front, back, and one or more edges.

Figure 20:
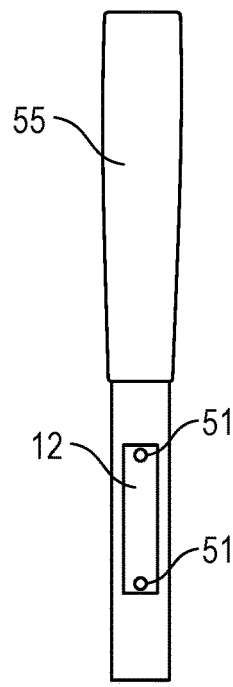
FIG. 20 depicts a back view of the securing plate (12) attached to the animal leash (50), according to an exemplary embodiment of the present invention.

The securing plate (12) is depicted in FIG. 20 as a rectangular shaped plate. It may have a front, back, and one or more edges. It may have a first end and a second end portions. It may also have one or more holes near the first end and the second end portions.

The clip (1), as depicted in FIG. 18, may be attached via the fasteners (51) to the leash (50). FIG. 20 illustrates a back view depicting the optional securing plate (12) attached to the leash (50) via the fasteners (51).

Figure 96:
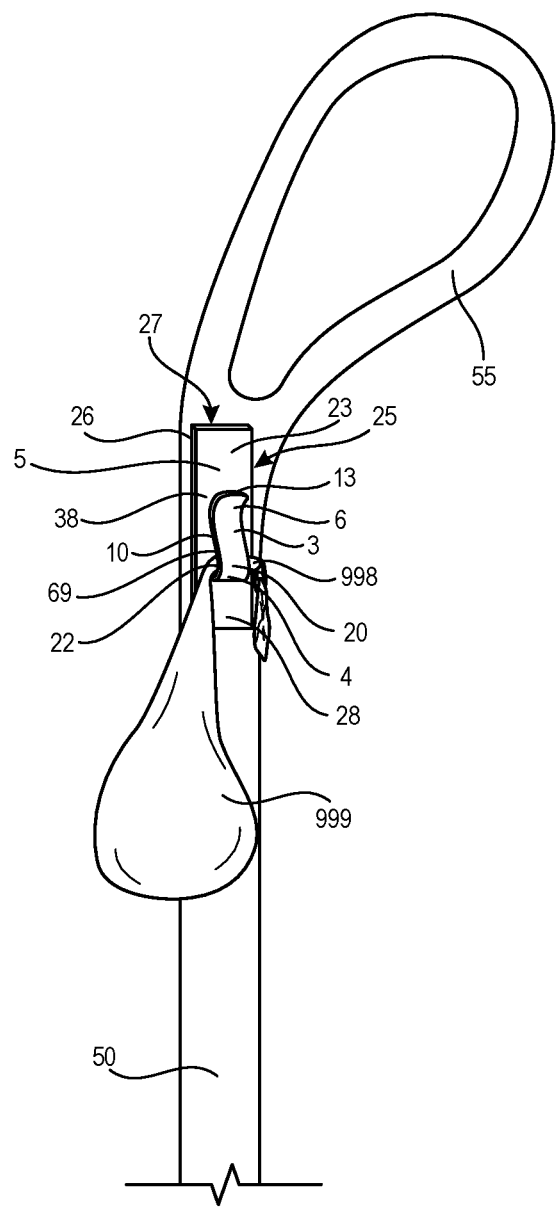
FIG. 96 depicts a frontal view of the clip (1) attached to the animal leash (50) according to an exemplary embodiment of the present invention. A waste filled bag (999) is depicted inserted into and secured in the clip channel (10).

The clip (1), as depicted in FIG. 96, may be attached near a handle (55) portion of the leash (50). The waste filled bag (999), as depicted in FIG. 96, may be inserted into and secured in the clip channel (10) and is depicted hanging from the clip (1). The clip (1) may be attached to the back portion, or the side portion of the leash (50) in any of these embodiments.

Figure 55:
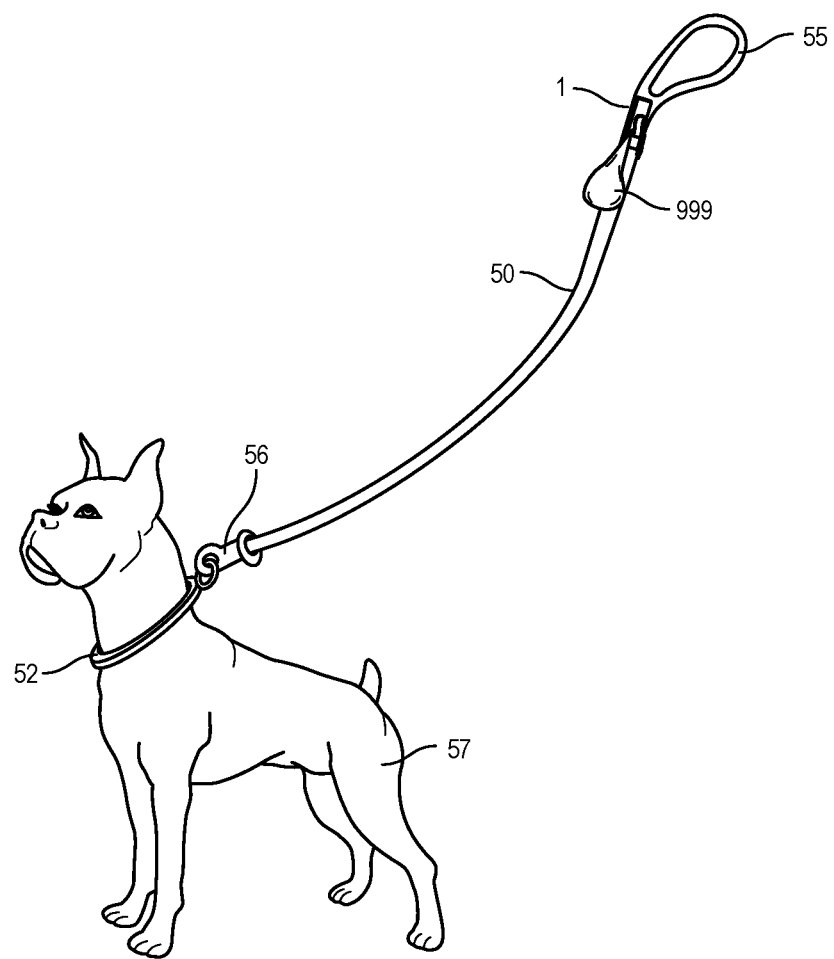
FIG. 55 depicts the clip (1) attached to the animal leash (50) and supporting the waste filled bag (999), according to an exemplary embodiment of the present invention. Leash (50) is attached to pet collar (52) which is attached to dog (57).

FIG. 55 depicts the clip (1) attached to the leash (50). The leash (50) may be secured to the pet collar (52) of a pet animal such as the dog (57). The waste filled bag (999) is depicted inserted into the clip channel (10) and supported and hanging from the clip (1).

Figure 11:
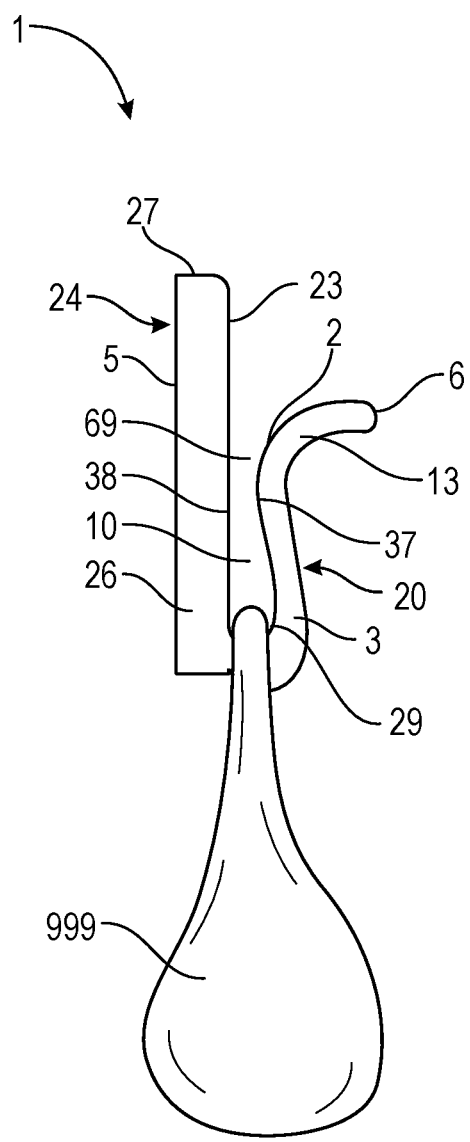
FIG. 11 depicts a right lateral view of the clip (1) supporting the waste filled bag (999) in the clip channel (10), according to an exemplary embodiment of the present invention.
Figure 12:
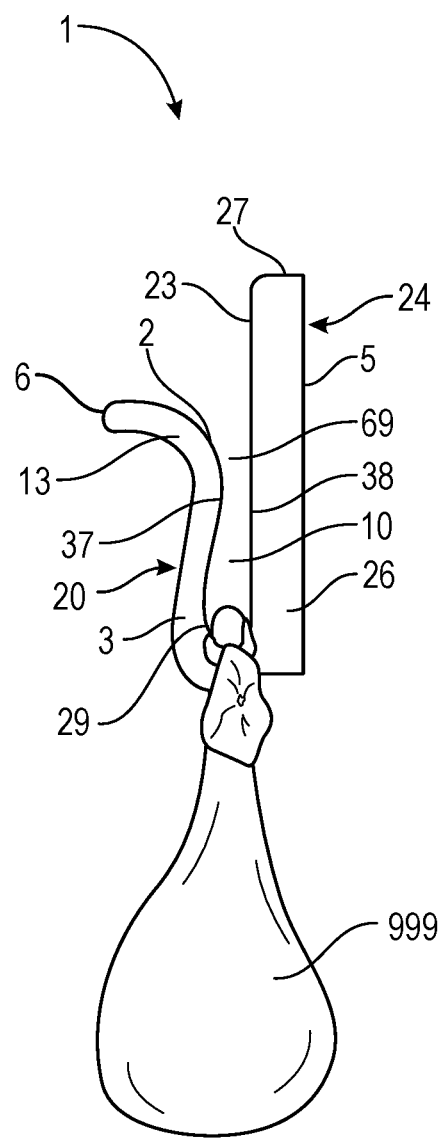
FIG. 12 depicts a left lateral view of the clip (1) supporting the waste filled bag (999) in the clip channel (10), according to an exemplary embodiment of the present invention.

Actions of the invention, and the clip (1) embodiment. A user may insert the knotted waste filled bag (999) into the clip channel (10), orienting the waste filled bag's (999) length parallel to the opening of the clip channel (10). The user may slide the waste filled bag (999) into the clip channel (10) towards the end of channel (29) until the waste filled bag (999) is in the clip channel (10). Of note the waste filled portion of the bag is not to be inserted into the clip channel but rather the excess bag material above the level of the waste. The waste filled bag (999) may be partially held in place by the wedge force of the waste filled bag (999) between the channel wall portion (37) and the channel wall portion (38). The waste filled bag (999) may be supported in part by the knot (998) against the borders of the lateral opening (69). The waste filled bag (999) is depicted supported in the clip channel (10) in FIG. 11 and FIG. 12. If the diameter of the knot (998) is larger than that of an opening width of the lateral opening (69), then it may restrict the knot (998) section of the waste filled bag (999) from entering the clip channel (10). It may in turn support the waste filled bag (999) from the clip (1).

The clip (1) may be attached to the leash (50) in which case the leash (50) may support the clip (1) and the waste filled bag (999). The user may handle the animal via the leash (50), and the bag (900) may be supported in the clip (1), thus negating an animal handler's need to carry the bag (900). Other objects could be supported in the clip channel (10) including, but not limited to, rings such as key rings, loops of material, or cord. Objects may be removed from the clip channel (10). The user may grasp the object such as the bag (900) and gently pull it towards the opening of the clip channel (10) until the bag (900) is pulled free from the clip channel (10). The user may then dispose the bag (900) as per preferences.

Figure 9:
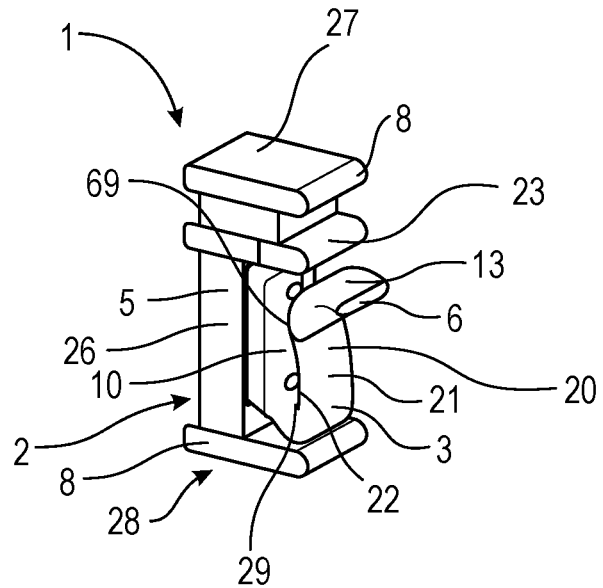
FIG. 9 depicts a front right view of a version of the clip (1) with a securing area (8) ridges, according to an exemplary embodiment of the present invention.
Figure 10:
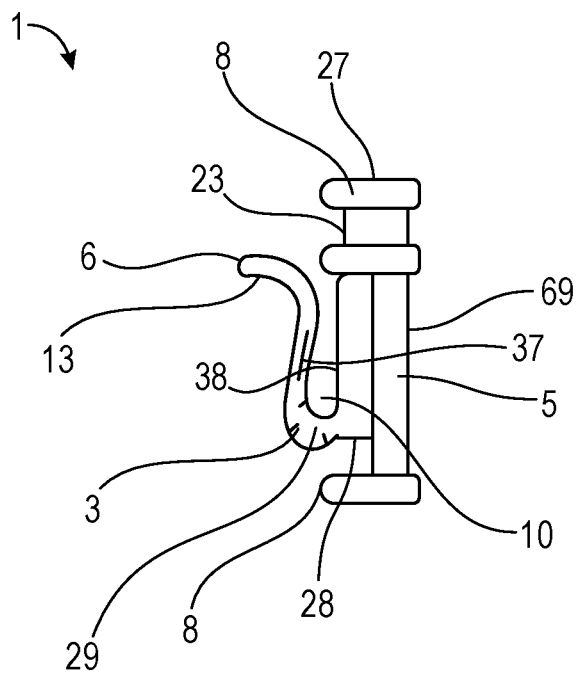
FIG. 10 depicts a left lateral view of a version of the clip (1) with the securing area (8) ridges, according to an exemplary embodiment of the present invention.

A slight variation to the clip (1) embodiment is illustrated in FIG. 7, FIG. 8, FIG. 9, and FIG. 10. The variation adds securing areas (8) to the base (5) section. The securing area (8) may comprise one or more raised portions near the end of base (27) and the end of base (28) portions. The securing areas (8) may be ridges on the base (5), and may be engineered to facilitate channeling a strap (14) that may wrap around the clip (1) and the leash (50). The securing area (8) in conjunction with the strap (14) may be utilized to secure the clip (1) to another device such as the leash (50). The securing area (8) is depicted in FIG. 9 and FIG. 10.

The strap (14) may comprise a length of material used to wrap around another object in order to secure the clip (1) to it. The strap (14) may be made of any variety of materials that would serve its purpose which may include, but is not limited to, Velcro like material, zip ties, banding, cloth, fabric, cord, and wire. The strap (14) may be embedded into one or more structures. It may include a clasp or securing mechanism attached to or built into it, as the case with a zip tie. The strap (14) may be selectively removable. The strap (14) may be affixed more permanently such that it may not be selectively removed. The securing area (8) may be engineered to permit the clip (1) to hang from the strap (14).

Alternative Embodiments—Detailed descriptions of alternative embodiments follow, but first a few notes regarding the present invention.

The body (3) portion may be a separate body or may be a continuation of the base (5), as it is described and depicted in the preferred embodiment. The body (3) and the base (5) may move slightly relative to one and other, for example, in a rotational motion.

In any embodiment of the present invention, a portion of the leash (50) may function as one or more of the channel wall portion (37), or the channel wall portion (38) that forms the clip channel (10).

In any embodiment of the present invention, a portion of the handle (74) may function as one or more of the channel wall portion (37), or the channel wall portion (38) that forms the clip channel (10).

In any embodiment of the present invention, a portion of a waste bag dispenser or tube may function as one or more of the channel wall portion (37), or the channel wall portion (38) that forms the clip channel (10).

In any of the embodiments presented, the surfaces of the channel walls may approximate or overlap each other. Although they may touch each or overlap, the inventive concept of the clip channel (10) remains present as the waste filled bag (999) may still be wedged, secured, or hung from the clip (1) and the clip channel (10).

Figure 13:
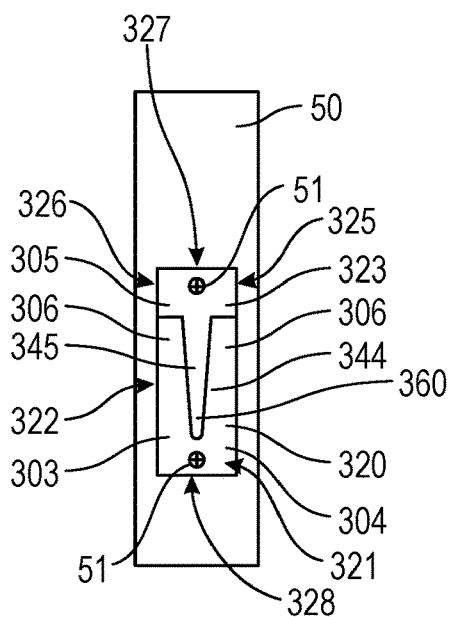
FIG. 13 depicts a front view of a split body (301) attached to the animal leash (50), according to an exemplary embodiment of the present invention.
Figure 16:
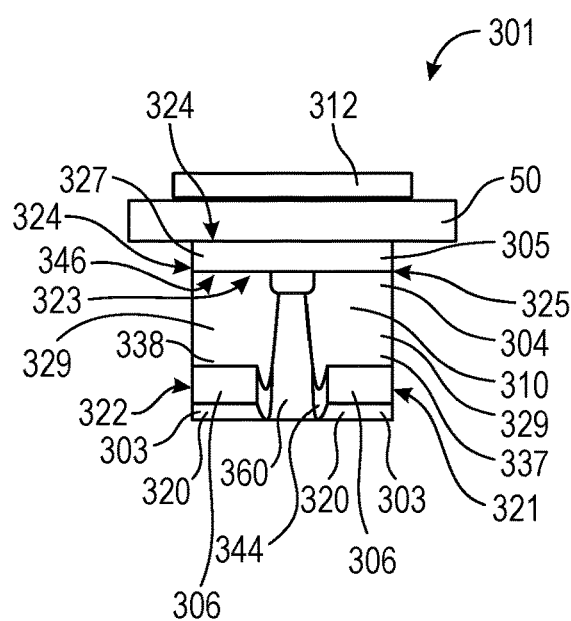
FIG. 16 depicts a top view of the split body (301) attached to the animal leash (50) and the optional securing plate (312), according to an exemplary embodiment of the present invention.

A clip channel (310) may be formed between two sections of a body (303) as depicted in FIG. 13 and FIG. 16. One or more clip channels (310) may be present in the same embodiment.

The various embodiments may be made of a variety of materials including, but are not limited to, hard durable plastics, thermoplastics, metals, and metal alloys, or any combination thereof.

Many embodiments reference the leash (50). An example of the leash (50) is illustrated in FIG. 55. It is depicted as a length of material. It may be made of a variety of materials including, but not limited to, nylon or polyester straps or ropes, thin cord, plastic or metal chain, and cable. The leash (50) is an example of a common dog or pet leash.

The leash (50) may comprise a length. It may be round or rectangular in cross sectional shape. If it is rectangular, it may comprise a front, back, a first lateral side, and a second lateral side. The leash (50) may have a first end that terminates in the handle (55) section. The handle (55) may be a loop formed by the same material as the body of the leash (50). The handle (55) may include additional handle features to assist the user with gripping the leash (50). The second end of the leash (50) may be attached to a hook (56) or clasp to facilitate connecting to an animal collar such as the pet collar (52) of a pet animal such as the dog (57). The hook (56) may be selectively opened or closed. It may be a hard material such as a metal or a plastic but is not limited to those.

The leash (50), as depicted in FIG. 55, is connected via the hook (56) to the pet collar (52) and the dog (57). The dog (57) may include any species of domestic canine.

Figure 84:
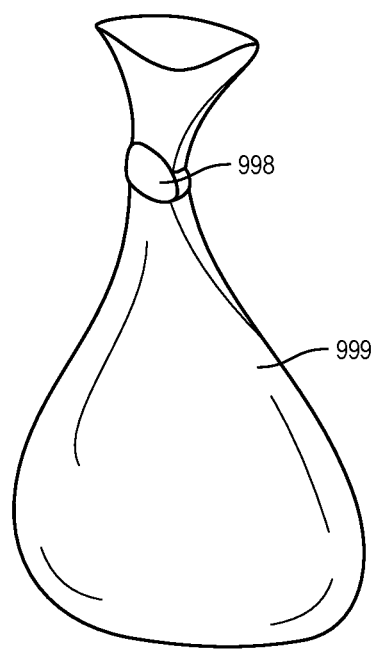
FIG. 84 depicts the waste filled bag (999) with a knot (998), according to an exemplary embodiment of the present invention.
Figure 85:
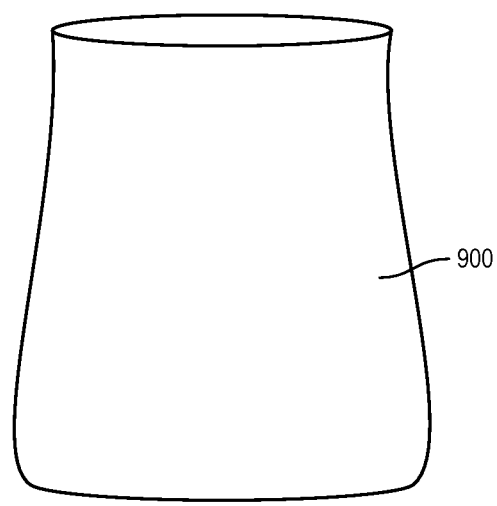
FIG. 85 depicts a bag (900), according to an exemplary embodiment of the present invention.

Many embodiments reference the bag (900) or the waste filled bag (999). The bag (900) may be a small to medium sized plastic or non-plastic bag of sufficient size to collect and contain a moderate volume of pet feces. The bag (900) may be similar to bags commonly used and sold for the purpose of pet waste pick up. Commonly sold pet waste bags are often approximately 1-foot square when laid flat. The waste filled bag (999) may represent the bag (900) containing a small to moderate quantity of animal feces. The waste filled bag (999) may have a knot (998) tied near its opening to close the back off. The bag (900) is depicted in FIG. 85 and the waste filled bag (999) is depicted alone in FIG. 84. They are also depicted in use with various other embodiments of the present invention.

Alternative Embodiment: Living Hinge Clip (101)

The living hinge clip (101) comprises a clip channel (110) formed by a channel wall portion (137) and a channel wall portion (138). The primary function of the living hinge clip (101) is to support one or more waste filled bags (such as the waste filled bag (999)), one or more rings, or one or more cords.

The living hinge clip (101) may be made of a variety of materials including, but are not limited to, hard durable plastics, thermoplastics, metals, and metal alloys. Additionally, the living hinge clip (101) may be a combination of materials.

The living hinge clip (101) comprises a body (103) and a base (105) connected via a living hinge (130) to form the hinge channel (110). The living hinge (130) portion is a variation of the base to body transition zone (4) described in the clip (1) embodiment.

The living hinge clip (101) and the living hinge (130) are depicted in FIG. 43 from a top view. The living hinge (130) may comprise a curved section extending from the base (105) to the body (103). The living hinge (130) may be curved convexly on the clip channel (110) side, or in other embodiments, it may be curved concavely on the clip channel (110) side. The concave surface of the living hinge (130) may represent an end of channel (129). The curved section of the living hinge (130) may permit motion to occur between the body (103) and base (105). The motion may in turn widen the space between the channel wall portion (137) and the channel wall portion (138), and the clip channel (110). A wider clip channel (110) may make it easier to insert an object such as the bag (900) into the clip channel (110). The living hinge (130) may be made of a somewhat flexible material such as a plastic, or a metal that may permit some elastic deformation.

Figure 38:
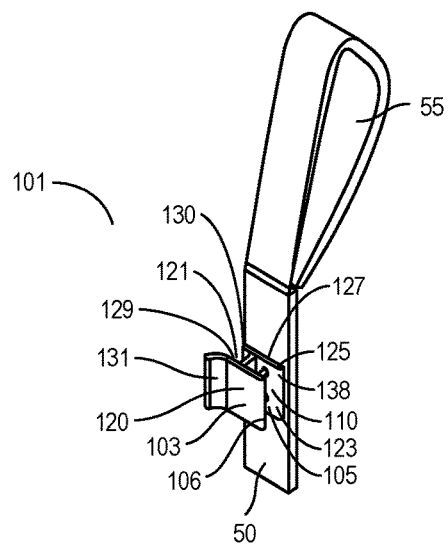
FIG. 38 depicts a top, front, and left view of a living hinge clip (101) in an open position attached to the animal leash (50), according to an exemplary embodiment of the present invention.
Figure 39:
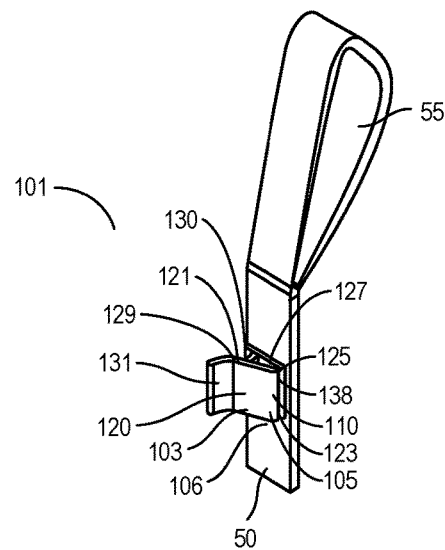
FIG. 39 depicts a top, front, and left view of the living hinge clip (101) in a closed position attached to the animal leash (50), according to an exemplary embodiment of the present invention.

The living hinge (130) may preference a closed position of the device as depicted in FIG. 39 and FIG. 42. Force may be used to move the living hinge clip (101) to an open position as depicted in FIG. 43 and FIG. 38.

The body (103) may comprise an elongated body with a front of body (120) that may generally face outward from the clip channel (110), a back portion of body (102) that may generally face the clip channel (110), two lateral portions of body (121) and (122) that may generally face perpendicular to the back portion of body (102). The back portion of body (102) may form the channel wall (137) portion of the clip channel (110). The channel wall (137) may partially form the clip channel (110). The body (103) may be generally flat or planer in shape as depicted in FIG. 43, or it may be curved in shape.

The body (103) may comprise an end (106), as depicted in FIG. 43, at its terminal portion. The end (106) may be relatively in line with the body (103) as depicted in FIG. 43, or it may curve outwardly from the base (105) so as to create the channel guide (113) feature similar in function to the channel guide (13) that is depicted in FIG. 3. An example of what the channel guide (113) may look like is illustrated in FIG. 46.

FIG. 43 depicts a top view of the living hinge clip (101). The body (103) may transition to form a body handle (131). The body handle (131) may comprise a curved section that extends from the body (103) and curves outwardly away from the base (105). The body handle (131) may comprise features on its outer surface to facilitate grip. The function of the body handle (131) section is to provide leverage arm to the living hinge (130), and an area that the user may use to press the handle so that the living hinge clip (101) may open.

A top view of the living hinge clip (101) and the base (105) is depicted in FIG. 43 as a planer body connected to the living hinge (130). The base (105) may comprise a front of base (123) and a back of base (124). The front of base (123) may form the channel wall portion (138) of the clip channel (110). The base (105) may comprise a lateral portion of body (126) and a lateral portion of body (125) that may generally face opposite one and other and generally face perpendicular to the front of base (123) and the back of base (124). The base (105) may have a first end of base (127) portion and a second end of base section (128).

Figure 53:
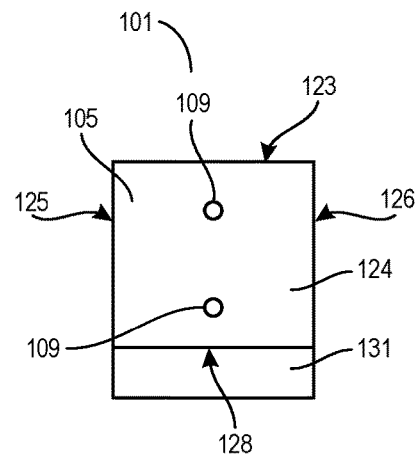
FIG. 53 depicts a back view of the living hinge clip (101), according to an exemplary embodiment of the present invention.

FIG. 53 depicts a back view of the living hinge clip (101). It depicts the back of base (124) with two securing holes (109). The base (105) may have other features such as ridges or securing areas to help facilitate connecting to or fastening to another body or object. The fasteners (51) may secure the device to another object via the securing holes (109).

Figure 51:
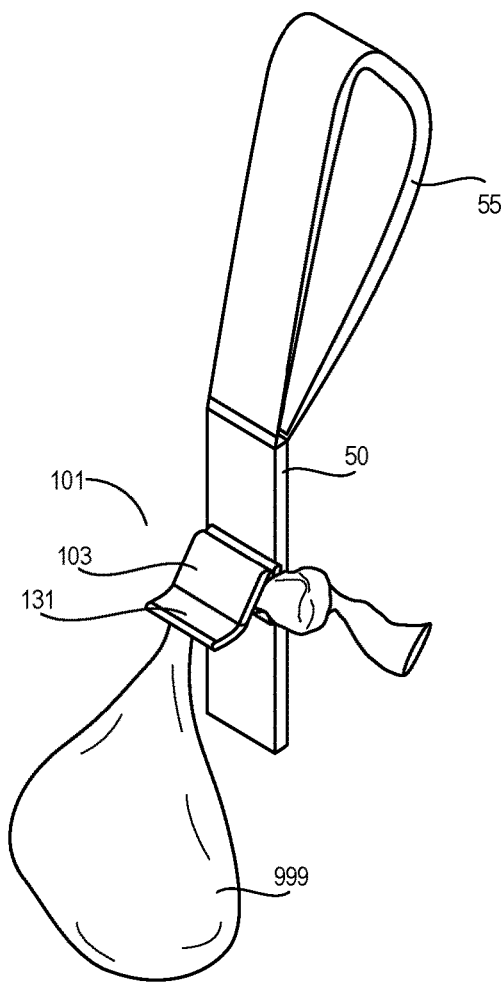
FIG. 51 depicts a front, top, and left view illustrating the living hinge clip (101) attached to the animal leash (50), according to an exemplary embodiment of the present invention. A waste filled bag (999) is illustrated supported in the living hinge clip (101).

The living hinge clip (101) may be oriented in a variety of directions. In FIG. 51, it is depicted with the body handle (131) facing away from the handle (55) portion of the leash (50). The living hinge clip (101) may be oriented in any other direction including, but not limited to, turned 90 degrees so that the opening to the clip channel (110) faces the lateral portion of the leash (50) and is perpendicular to the length of the leash (50).

The living hinge clip (101) may connect to another object or body in a variety of fashions. It may connect via the fasteners (51) such as, but are not limited to, screws, rivets, pins, tacks. It may be secured via a material that wraps around and secures it in place such as, but is not limited to, Velcro, zip tie, clip, or banding material. It may be sewn in place. It may have an overlay material such as fabric, strap, or cording material that is secured such that the living hinge clip (101) is held in place.

The overlay (15) may be used to secure the living hinge clip (101) to another structure such as the leash (50). The overlay (15) may comprise the overlay body (16) which may comprise the overlay relief (17). The overlay body (16) may comprise the body that makes up the overlay (15). The overlay relief (17) may be a hole or relief area in the overlay body (16) of sufficient size such that the body (103) of the clip (101) may be inserted and permitted to pass through it. It may be of small enough size to restrict the base (105) to pass through, particularly after the overlay (15) is secured in place. The overlay body (16) may be fastened to another object such as the leash (50) or harness. The body (103) may protrude through the overlay relief (17) area of the overlay (15).

The overlay (15) may be made of a variety of materials including fabric like materials and textiles, such as nylon straps or rope as well as plastics such as thermoplastics, or metals. It may be made of the same material, or a portion of the leash (50). In some embodiments, the overlay (15) may be a fabric like material in which it may be sewn into place.

Figure 41:
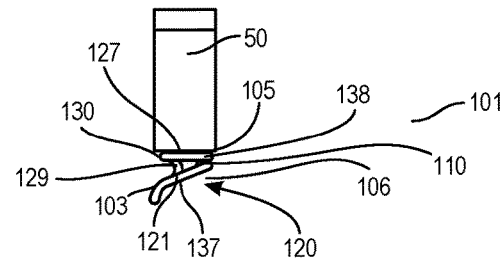
FIG. 41 depicts the living hinge clip (101) in a closed position attached to the animal leash (50) from a top view, according to an exemplary embodiment of the present invention.

FIG. 38 and FIG. 39 depict the living hinge clip (101) attached to the leash (50). In FIG. 38, the living hinge clip (101) is in an open position, and in FIG. 39, the living hinge clip (101) is in a closed position. FIG. 41 depicts a top view of the living hinge clip (101) attached to the leash (50).

Figure 40:
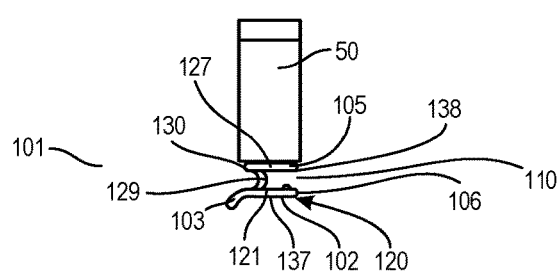
FIG. 40 depicts the living hinge clip (101) in an open position attached to the animal leash (50) from a top view, according to an exemplary embodiment of the present invention.

FIG. 40 and FIG. 41 depict the living hinge clip (101) attached to the leash (50) from a top view. In FIG. 40, the living hinge clip (101) is depicted in an open position, and in FIG. 41, the living hinge clip (101) is depicted in a closed position.

Action of the living hinge clip (101): The user may depress the body handle (131) so that the clip channel (110) between the body (103) and the base (105) widens or opens. The user may insert an object such as the bag (900) into the clip channel (110), perhaps orienting the bag's (900) length parallel to the opening of the clip channel (110). The user may slide the bag (900) into the clip channel (110) to the end. The user may then release pressure on the body handle (131) so that the body (103) and the base (105) approximate or close. The bag (900) may be held in place by the force of the living hinge clip (101). The living hinge clip (101) may be attached to the leash (50), as depicted in FIG. 38 in which case the leash (50) may support the living hinge clip (101) and the bag (900), thus negating an animal handler's need to carry the waste filled bag (999).

The waste filled bag (999) is depicted supported by the living hinge clip (101) which is attached to the leash (50) near the leash handle (55).

To remove the bag (900) from the clip channel (110), the user may grasp the bag (900) and gently pull it towards the opening of the clip channel (110) until the bag (900) is pulled free from the clip channel (110).

Alternative Embodiment: Hinge Clip (201)

The hinge clip (201) may comprise a clip channel (210) formed by a channel wall portion (237) and a channel wall portion (238). The primary function of the hinge clip (201) is to support the waste filled bag (999), a ring, or cord.

One embodiment of the hinge clip (201), as depicted in FIG. 32, comprises a body (203), a base (205), and a hinge component (200). Also depicted in FIG. 32 are the fasteners (51).

The hinge component (200) may be comprised of a combination of one or more hinge leaf (231), hinge leaf (232), hinge knuckle (233), hinge knuckle (234), hinge pin (235), and hinge spring (236).

The hinge clip (201) may share similar features with the clip (1) except that base to body transition zone (4) may be replaced with the hinge component (200).

As depicted in FIG. 31, the base (205) may comprise a flat rectangularly shaped body with a front of base (223) that generally faces the clip channel (210), a lateral portion of body (225) and a lateral portion of body (226) that may face opposite one and other and perpendicular to the front of base (223). It may also comprise a back of base (224), one end of base (227), and a separate end of base (228). A portion of the front of base (223) may form the channel wall portion (238).

The base (205) may include securing holes (209). As depicted in FIG. 31, there are two securing holes near end of base (227) and near end of base (228). The securing holes (209) may be of small diameter to permit the securing fasteners (51) to attach through them.

The base (205) may have the hinge leaf (232) that extend laterally as semicircular shaped bodies from the surface of the base (205). The hinge leaf (232) may have the hinge knuckle (234) that may be a circular hole or a recess for the hinge pin (235) to set, as depicted in a lateral view such as in FIG. 33. These features may form a portion of the hinge component (200).

The hinge component (200) may include the hinge pin (235). The hinge pin (235) may be a separate body such as a cylindrically shaped short metal rod, or the hinge pin (235) may be a protuberance formed as part of or integrated into the hinge clip (201). This may be a small protuberance that a portion of hinge knuckle may set on or over.

The body (203) of the hinge clip (201) is depicted in FIG. 29, FIG. 30, FIG. 31, FIG. 32, FIG. 33, FIG. 34, FIG. 35, and FIG. 36. The body (203) may comprise a rectangularly shaped body with a front of body (220) that may generally face outward from the clip channel (210), a back portion of body (202) that may generally face into the clip channel (210), two lateral portions of body (221) and (222) that may face generally away from one and other and in a somewhat perpendicular direction to the plane of the front of body (220). A portion of the back portion of body (202) may comprise the channel wall portion (237). The channel wall portion (237) and the back portion of body (202) are depicted in FIG. 35.

Figure 30:
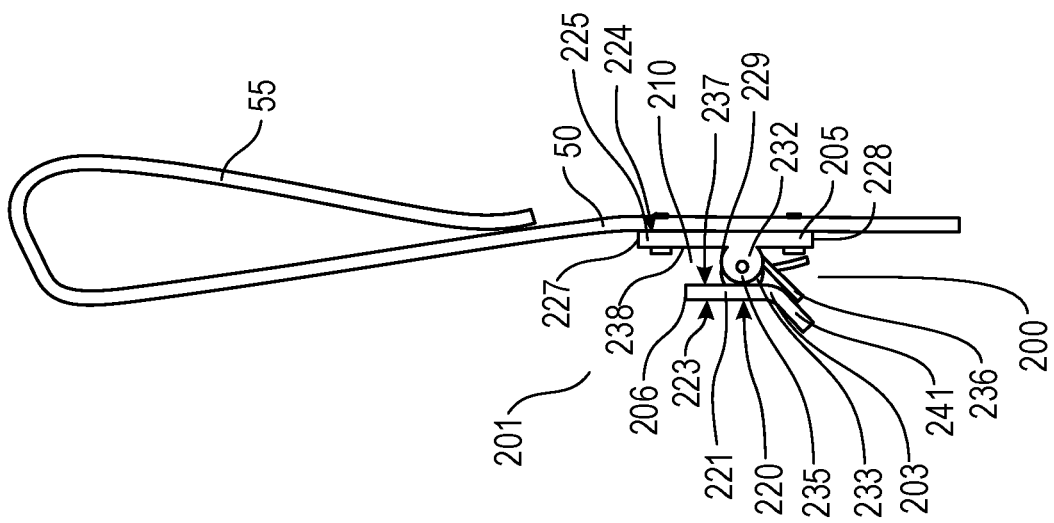
FIG. 30 depicts a left lateral view of the hinge clip (201) in an open position attached to the animal leash (50), according to an exemplary embodiment of the present invention.

The body (203) may be generally flat or planer in shape as depicted in the lateral view of FIG. 30 or FIG. 33. The body (203) may be curved in shape similar to how the body (3) is depicted in FIG. 5 and FIG. 6. An end of channel (229) may be at the hinge component (200).

Figure 37:
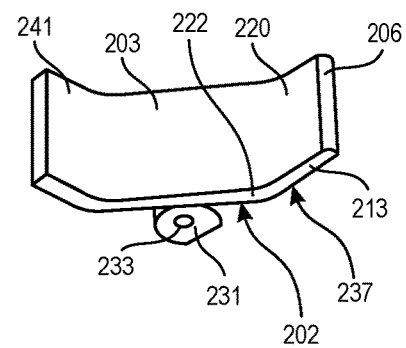
FIG. 37 depicts a bottom and front view of the body (203) with an optional channel guide (213), according to an exemplary embodiment of the present invention.

The body (203) may comprise an end (206), as depicted in FIG. 32, at its terminal portion. The end (206) may be relatively in line with the body (203) as depicted in FIG. 33, or it may curve outwardly away from the base (205) portion so as to create the channel guide (213) feature similar in function to the channel guide (13) of the clip (1) that is depicted in FIG. 3. An example illustration of the channel guide (213) is depicted in FIG. 37.

FIG. 33 depicts a lateral view of the hinge clip (201). The body (203) may transition to form a body handle (241). The body handle (241) may comprise a curved section that extends from the body (203) and curves outwardly away from the base (205). The body handle (241) may comprise features on its outer surface to facilitate grip. The function of the body handle (241) section is to provide leverage arm to the hinge component (200), and an area where the user may press the handle so that the hinge component (200) may open.

The body (203) may have the hinge leaf (231) that extend laterally from the body (203) as semicircular shaped bodies. The hinge leaf (231) may have the hinge knuckle (233) that may be a circular hole or a recess for the hinge pin (235) to set, as depicted in a lateral view of FIG. 33. These features may form a portion of the hinge component (200).

The hinge leaf (231) and the hinge leaf (232) may be approximated so that the hinge knuckle (233) and the hinge knuckle (234) may align. The hinge pin (235) may be inserted into the hinge knuckle (233) and the hinge knuckle (234) so that the hinge component (200) are connected.

The hinge spring (236) may be included in line with the axis of rotation, or remote to it, or not included. The hinge spring (236) is depicted in FIG. 30 between the hinge leaf (231) and the hinge leaf (232) and in line with the axis of rotation of the hinge component (200). The hinge springe (236) may be a torsion spring. The hinge spring (236) may preference a closed position. It may exert force on the base (205), the body (203), or the body handle (241). In FIG. 34, the hinge springe (236) is depicted next to the hinge clip (201), and oriented such that the arms of the hinge springe (236) may exert force on the base (205) and the body handle (241). This may be a preferred orientation of the hinge spring (236) in relation to the hinge clip (201).

The hinge clip (201) may be selectively opened and closed to expand or decrease the size of the clip channel (210). In this embodiment, the hinge component (200) and the hinge spring (236) favor a closed position, so that the user may exert force on the hinge clip (201) in order to open it. Other embodiments might not include a spring with the hinge component (200), but instead use a clasp, lock, or fastener of sorts to close the hinge clip (201) into a closed position.

In some embodiments, the clip channel (210) may be significantly narrow such as the hinged clip (201), where in a closed position, the back portion of body (202) and the front of base (223) may contact each other. The surfaces of the channel wall portion (237) and the channel wall portion (238) may approximate and may touch each other. Although they may touch each other, the clip channel (210) is still present as the bag (900) may still be wedge or secure into the clip channel (210). The body (203) may pivot away from the base (205) to reveal a greater portion of the clip channel (210).

Figure 29:
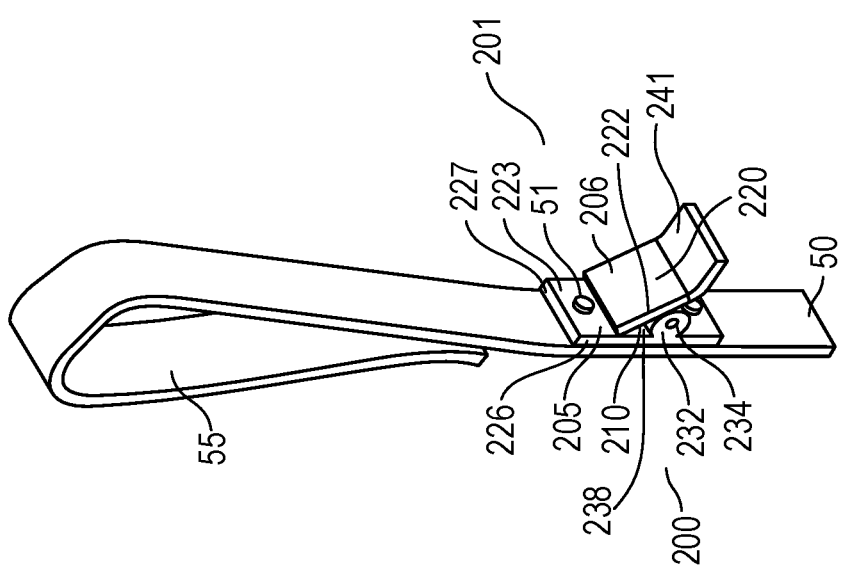
FIG. 29 depicts a top, front, and right view of a hinge clip (201) in a closed position attached to the animal leash (50), according to an exemplary embodiment of the present invention.
Figure 36:
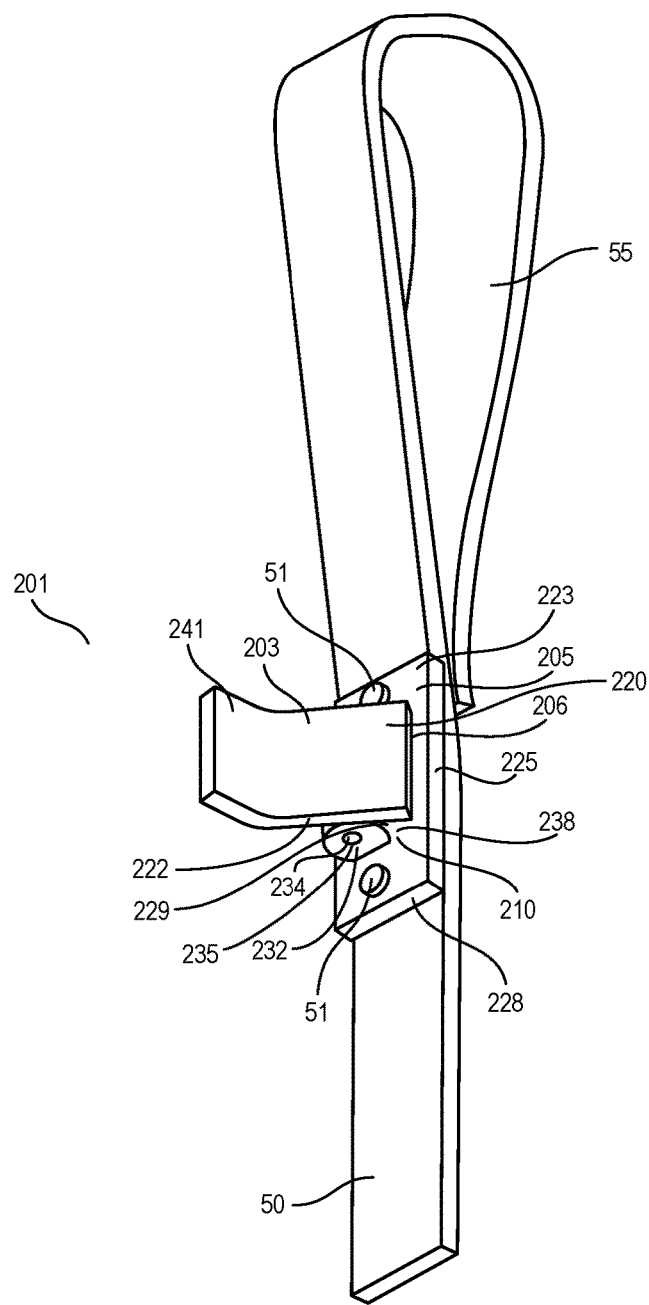
FIG. 36 depicts a bottom, front, and right view of the hinge clip (201) in a closed position attached to the animal leash (50), according to an exemplary embodiment of the present invention.

The hinge clip (201) may be oriented in a variety of directions. In FIG. 29, it is depicted with the body handle (241) facing away from and the opening to the clip channel (210) facing towards the handle (55) of the leash (50). The hinge clip (201) may be oriented in any other direction including, but is not limited to, turned 90 degrees so that the opening to the clip channel (210) faces the lateral portion of the leash (50) and is perpendicular to the length of the leash (50), as depicted in FIG. 36.

The hinge clip (201) may be made of a variety of materials including, but are not limited to, hard durable plastics, thermoplastics, metals, and metal alloys. Additionally, the hinge clip (201) may be made of a combination of materials.

The hinge clip (201) may be attached to variety of other bodies or structures such as the leashes (50) including retractable leashes, handles, pooper scoopers, dog harnesses, belts, straps, or other clothing and equipment. The hinge clip (201) may hang from another structure. The hinge clip (201) is depicted attached to the leash (50) in FIG. 29 and FIG. 30.

The hinge clip (201) may attach to another object or body with a variety of methods and materials. The hinge clip (201) may connect via the fasteners (51), such as, but are not limited to, screws, rivets, pins, or tacks. The hinge clip (201) may be secured via a material that wraps around and secures it in place, such as, but is not limited to, Velcro, zip tie, clip, or banding material. The hinge clip (201) may be sewn in place. The hinge clip (201) may have the overlay (15) material such as fabric, strap, or cording material that is secured such that the hinge clip (201) is held in place.

The overlay (15) may be used to secure the hinge clip (201) to another structure such as the leash (50). The overlay (15) may comprise the overlay body (16) which may comprise the overlay relief (17). The overlay body (16) may comprise the body that makes up the overlay (15). The overlay relief (17) may be a hole or relief area in the overlay body (16) of sufficient size that the body (203) of the clip (201) may be inserted and permitted to pass through it. It may be of small enough size to restrict the base (205) to pass through, particularly after the overlay (15) is secured in place. The overlay body (16) may be fastened to another object such as the leash (50) or harness. The body (203) of the clip (201) may protrude through the overlay relief (17) area of the overlay (15).

The overlay (15) may be made of a variety of materials including fabric like materials and textiles, such as nylon straps or rope as well as plastics such as thermoplastics, or metals. It may be of the same material as or a portion of the leash (50). In some embodiments, the overlay (15) may be a fabric like material in which it may be sewn into place.

Action of the hinge clip (201): The user may depress the body handle (241) so that the clip channel (210) between the body (203) and the base (205) widens or opens. The user may insert an object such as the bag (900) into the clip channel (210), perhaps orienting the bag's (900) length parallel to the opening of the clip channel (210). The user may slide the bag (900) into the clip channel (210) to the end. The user may then release pressure on the body handle (241) so that the body (203) and the base (205) approximate or close. The bag (900) may be held in place by the force of the hinge clip (201). The hinge clip (201) may be attached to the leash (50), as depicted in FIG. 38, in which case the leash (50) may support the hinge clip (201) and the bag (900). The user may grasp the leash (50). The bag (900) may be supported in the hinge clip (201), thus negating an animal handler's need to carry the waste filled bag (999).

To remove the bag (900) from the clip channel (210), the user may grasp the bag (900) and gently pull it towards the opening of the clip channel (210) until the bag (900) is pulled free from the clip channel (210).

Alternative Embodiment: Split Body (301)

The split body (301) may be made of a variety of materials including, but are not limited to, hard durable plastics, thermoplastics, metals, and metal alloys. Additionally, the split body (301) may be a combination of materials.

The split body (301) is depicted in FIG. 13, FIG. 14, FIG. 15, FIG. 16, and FIG. 17. The split body (301) may have similar features and functions to the clip (1). The split body (301) may comprise one or more clip channels.

FIG. 16 depicts a top view of the split body (301), the clip channel (310), and a clip channel (360). The clip channel (310) may be formed by a channel wall portion (346), a channel wall portion (337), and a channel wall portion (338). The clip channel (360) may be formed by a channel wall portion (344) and a channel wall portion (345). The clip channel (360), in this embodiment, is present between the projections of the body (303) portion. The primary function of the split body (301) is to support one or more waste filled bags (such as the waste filled bag (999)), a ring, or cord.

Figure 14:
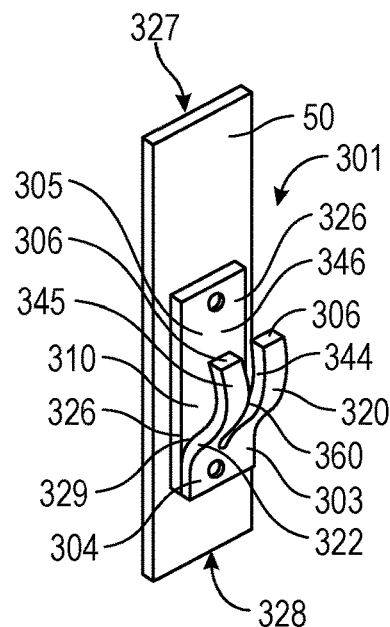
FIG. 14 depicts a top, front, and right view of the split body (301) attached to the animal leash (50), according to an exemplary embodiment of the present invention.

FIG. 14 depicts the split body (301) comprising the clip channel (310), the clip channel (360), the body (303), and a base (305). FIG. 14 depicts an isometric top, right lateral, and frontal view of the split body (301) attached to the leash (50). The base (305) portion may comprise a rectangular shaped body with a front of base (323), a back of base (324), a left lateral portion of base (325), a right lateral portion of base (326), a first end of base (327), and a second end of base (328). The front of base (323) may comprise the channel wall portion (346).

Figure 17:
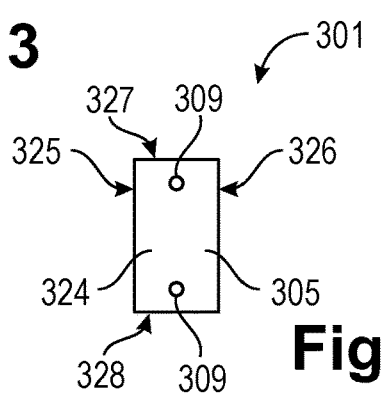
FIG. 17 depicts a back view of the split body (301), according to an exemplary embodiment of the present invention.

The back of base (324) is depicted in FIG. 17. FIG. 17 depicts the back of base (324) with securing holes (309) near the end of base (327) and near the end of base (328). The securing holes (309) may be of small diameter to permit the securing fasteners (51) to or through them.

Figure 15:
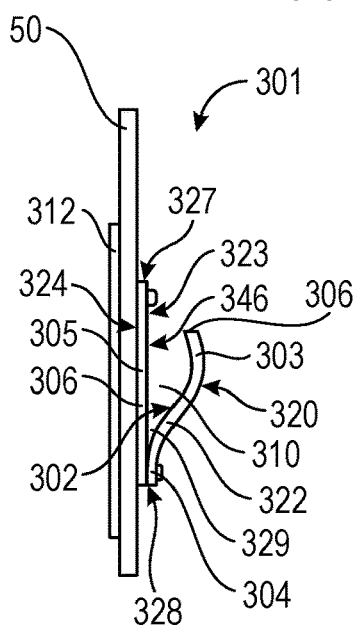
FIG. 15 depicts a right lateral view of the split body (301) attached to the animal leash (50) and an optional securing plate (312), according to an exemplary embodiment of the present invention.

FIG. 15 depicts a base to body transition zone (304) as a curved portion of the split body (301) extending from the front of base (323) to the body (303). As depicted in frontal view as in FIG. 13, the base to body transition zone (304) may be of similar width to the base (305) and the body (303). The base to body transition zone (304) may be of other shapes and sizes. The base to body transition zone (304) may be significantly small.

As depicted in FIG. 15, the end of channel (29) may be present on the channel side of the base to body transition zone (304). As depicted in FIG. 13, the body (303) may comprise two or more elongated portions extending from the base to body transition zone (304) portion of the split body (301). The extended body (303) portions, in this embodiment, may be slightly curved as viewed in FIG. 15. The body (303) may be prong like extensions. Although it is depicted with edges, the prong like body (303) extensions may be a rounded shape. The body (303) may be spaced closely together so as to be separated by the narrow clip channel (360). The body (303) may flare or curve away from one and other at its terminal ends so as to create a wider opening into the clip channel (360). The first channel wall (344) may be located on an edge portion of one of the prongs. The second channel wall (345) may be located on an edge portion of the other prong. The two channel walls may be oriented towards each other and narrowly spaced so as to form the clip channel (360). The clip channel (360) may be of sufficient size to permit one or more bags (50) to be inserted into the channel, and narrow enough to prevent a knotted bag (900) from passing through the lateral opening of the clip channel (360). The internal separation distance of the clip channel (360) may be defined in this instance as the distance of separation between the first channel wall (344) and the second channel wall (345) portions that form the clip channel (360).

Another clip channel (310) may be present between the channel wall portion (337), the channel wall portion (338), and the channel wall portion (346). The back portions of body (302) may comprise the channel wall portion (337) and the channel wall portion (338). The front of base (323) may comprise the channel wall portion (338). An end of channel (329) may be present at one end of the clip channel (310).

The clip channel (310) may be of a different width and length than that of the clip channel (360) formed between the prong sections of body (303). It may have the same function of securing and supporting a similar function of supporting one or more waste filled bags (such as the waste filled bag (999)), a ring, or cord.

The body (303) may be comprised of a first lateral portion of body (321) or left side, a second lateral portion of body (322) or right side, a back portion of body (302), and a front of body (320).

The body (303) may terminate in an end (306). The terminal ends (306) may curve away from one and other or perhaps away from the base (305). The terminal ends (306) may taper or curve away from one and other so as to create a wider opening into the clip channel (360) as depicted in FIG. 13.

In some embodiments, the ends (306) may be in line with the bodies (303). In other embodiments, the bodies (303) may transition into a feature similar to the channel guide (13) of the clip (1) embodiment in which case the end portion of body (303) would form a curved section. Such channel guide (13) may comprise a curved section of similar profile to the body (303) that may curve away from the clip channel (310) and the base (305). The channel guide (13) may be an extension of the body (303) and the surfaces may transition smoothly between the two portions. The channel guide (13) may curve away from the base (305) so as to create a wider opening into the clip channel (310) between the base (305) and the body (303) so that an object may be inserted into the clip channel (310).

The body (303) portion may be a separate body or may be a continuation of the base (305). In some embodiments of the split body (301), the body (303) may move relative to the base (305), perhaps in a rotational motion. In other embodiments, the hinge component (200), such as, but is not limited to, the living hinge (101) may connect the base (305) and the body (303).

FIG. 15 depicts a right lateral view of the split body (301) attached to the leash (50) with the optional securing plate (312) and the fasteners (51). The fasteners (51), in the depicted embodiment, may include, but are not limited to, screws, pins, or rivets. The fasteners (51) may attach through or to the holes in the securing plate (312) and the split body (301), and through the leash (50) so that all components may be connected and secured together.

The split body (301) may be oriented in a variety of directions. The openings to the clip channel (310) and the clip channel (360) may be oriented in a variety of directions while preserving its function of the invention.

The split body (301) may be attached to variety of other bodies or structures such as the leashes (50) including, but are not limited to, retractable leashes, handles, pooper scoopers, dog harnesses, belts, straps, or other clothing and equipment. It is depicted attached to the leash (50) in FIG. 13, FIG. 14, FIG. 15, and FIG. 16.

The split body (301) may be attached to another object or body with a variety of methods and materials. It may connect via the fasteners (51), such as, but are not limited to, screws, rivets, pins, or tacks. It may be secured via a material that wraps around and secures it in place, such as, but is not limited to, Velcro, zip tie, clip, or banding material. It may be sewn in place. It may have the overlay (15) material such as fabric, strap, or cording material that secures and holds the split body (301) in place.

The overlay (15) may be used to secure the split body (301) to another structure such as the leash (50). The overlay (15) may comprise the overlay body (16) which may comprise the overlay relief (17). The overlay body (16) may comprise the body that makes up the overlay (15). The overlay relief (17) may be a hole or relief area in the overlay body (16) of sufficient size that the body (303) of the split body (301) may be inserted and permitted to pass through it. It may be of small enough size to restrict the base (305) from passing through, particularly after the overlay (15) is secured in place. The overlay body (16) may be fastened to another object such as the leash (50) or harness. The body (303) of the clip (301) may protrude through the overlay relief (17) area of the overlay body (16). The overlay body (16) may be secured to another body such as the leash (50).

The overlay (15) may be made of a variety of materials including fabric like materials and textiles, such as nylon straps or rope, as well as plastics such as thermoplastics, or metals. It may be of the same material as or a portion of the leash (50). In some embodiments, the overlay (15) may be a fabric like material in which it may be sewn into place.

Action of the split body (301): The user may insert an object such as the bag (900) into either or both of the clip channel (310) or the clip channel (360) such that the object wedges or is supported in the clip channel (310) or the clip channel (360). The user may orient the bag's (900) length parallel to the opening of the clip channel (310) or the clip channel (360). The user may slide the bag (900) into the clip channel (310) or the clip channel (360) to the end of the channel. A portion of the object such as a knot in the bag (900) may be supported in part by the body (303), the base (305), or combination of both. The bag (900) may be held in place by the wedge force of the split body (301). The split body (301) may be attached to the leash (50) as depicted in FIG. 13 in which case the leash (50) may support the split body (301) and the bag (900). The user may handle the animal via the leash (50) while the bag (900) may be supported in the split body (301), thus negating an animal handler's need to carry the waste filled bag (999). Other objects could be supported in the clip channel (310) and the clip channel (360) including, but are not limited to, rings such as key rings, loops of material or cord.

Objects may be removed from the clip channel (310) or the clip channel (360). The user may grasp the object such as the bag (900) and gently pull it towards the opening of the clip channel (310) or the clip channel (360) until the bag is pulled free.

Alternative Embodiment: Bulky Body (401)

The bulky body (401) embodiment may comprise a bulky body (401) version as depicted in FIG. 44, FIG. 45, FIG. 47, FIG. 48, FIG. 49, and FIG. 52. The bulky body (401) may share similar features and functions as the clip (1), except that the body (3) and the base (5) in this embodiment may be of a larger size and perhaps different shape than the flatter planer shapes of the clip (1).

Figure 50:
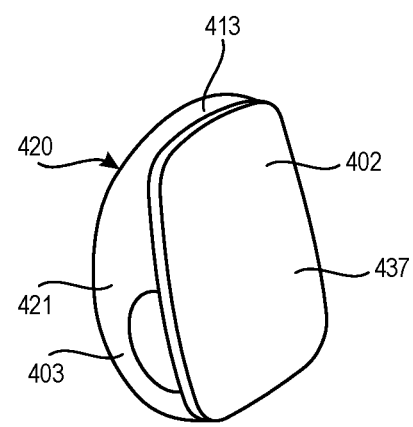
FIG. 50 depicts a back and left cross sectional view of the channel wall portion (437) and a back portion of body (402), according to an exemplary embodiment of the present invention.
Figure 52:
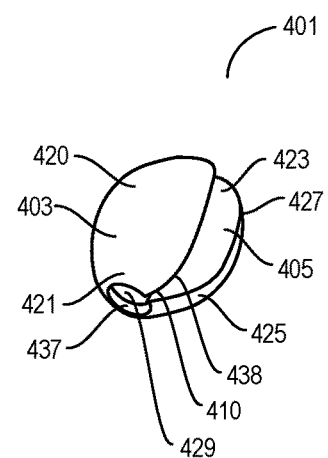
FIG. 52 depicts a bottom, front, and left illustration of the bulky body (401), according to an exemplary embodiment of the present invention.

As depicted in FIG. 52, the bulky body (401) may comprise a base (405), a body (403), and a clip channel (410). The clip channel (410) may comprise the channel wall portion (437) and the channel wall portion (438). The body (403) may comprise a front of body (420) that may generally face away from the clip channel (410), a back portion of body (402) that may generally face the clip channel (410), and two lateral portions of body (421) and (422) that may face generally away from one and other and in a somewhat perpendicular direction to the plane of the back portion of body (402). A portion of the back portion of body (402) may comprise the channel wall portion (437). The channel wall portion (437) and the back portion of body (402) are depicted in FIG. 50. An end of channel (429) portion may be present distal to the opening of the clip channel (410).

The base (405) section may comprise a somewhat semi-circular shaped body with a front of base (423) that generally faces the clip channel (410), and a lateral portion of body (425) and a lateral portion of body (426) that may face opposite one and other and somewhat perpendicular to the front of base (423). It may also comprise one end of base (427), and a second end of base (428). A portion of the front of base (423) may form the channel wall portion (438). It may have a back of base.

Figure 54:
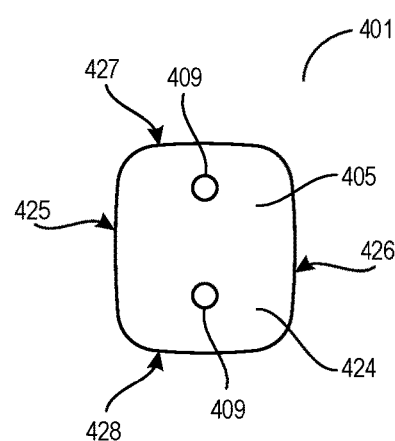
FIG. 54 depicts a back view of the bulky body (401), including illustration of a back of a base (424) and securing holes (409), according to an exemplary embodiment of the present invention.

The base (405) may include the securing holes (409). As depicted in FIG. 54 are two securing holes near the end of base (427) and near the end of base (428). The securing holes (409) may be of small diameter to permit the securing fasteners (51) to attach through them. The back of base (424) is also depicted in FIG. 54.

Figure 47:
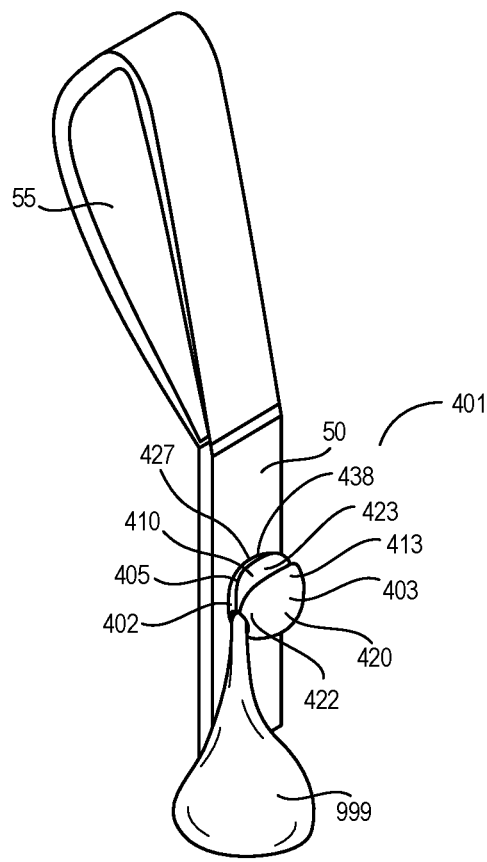
FIG. 47 depicts a top, front, and right view illustration of the bulky body (401) attached to the animal leash (50), according to an exemplary embodiment of the present invention. A waste filled bag (999) is depicted wedged into clip channel (410) and supported by bulky body (401).
Figure 48:
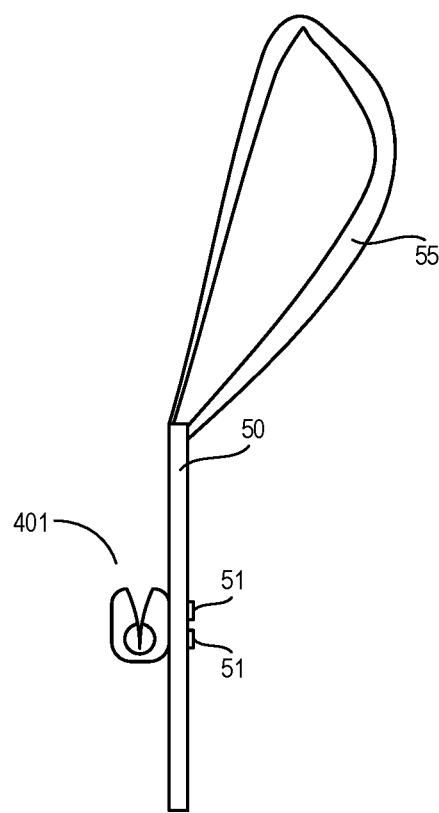
FIG. 48 depicts a left lateral view illustrating of the bulky body (401) attached to the animal leash (50), according to an exemplary embodiment of the present invention.
Figure 49:
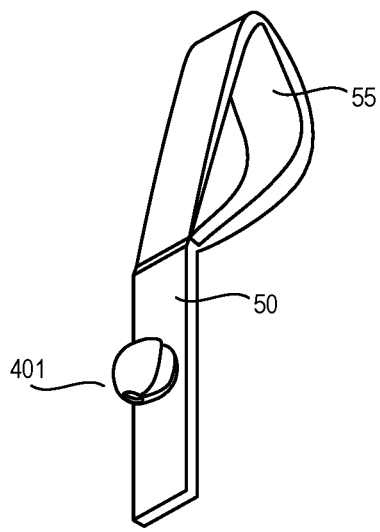
FIG. 49 depicts a bottom, front, and left view illustrating the bulky body (401) attached to the animal leash (50), according to an exemplary embodiment of the present invention.

FIG. 47 depicts the bulky body (401) attached to the leash (50) near the handle (55). The body (403) in this embodiment is slightly dome shaped. The base (405) may be secured to the leash (50) with the fasteners (51). The clip channel (410) may widen near the opening of the channel and curve to form a channel guide (413) section. The channel guide section (413) is illustrated in FIG. 48.

The clip channel (410) may be of sufficient size to accommodate a few sections of the bag (900). The bulky body (401) could be oriented in a variety of different orientations.

The user may insert an object such as the bag (900) into the clip channel (410), perhaps orienting the bag's (900) length parallel to the opening of the clip channel (410). The user may slide the bag (900) into the clip channel (410) to the end of channel (429). The object or bag (900) may be supported in part by the body (403), the base (405), or a combination of both. The bag (900) may be held in place by the wedge force of the bag (900) between the channel wall portion (437) and the channel wall portion (438). The bag (900) may be suspended by a knot in the bag (900) against the borders of the lateral opening of channel. The bulky body (401) may be attached to the leash (50) in which case the leash (50) may support the bulky body (401) and the bag (900). The user may handle the animal via the leash (50) while the bag (900) may be supported in the bulky body (401), thus negating an animal handler's need to carry the waste filled bag (999). Other objects could be supported in the clip channel (410) including, but are not limited to, rings such as key rings, loops of material, or cord. Objects may be removed from the clip channel (410). The user may grasp the object such as the bag (900) and gently pull it towards the opening of the clip channel (410) until the bag is pulled free from the clip channel (410).

Alternative Embodiment. Embedded Version (501)

The embedded version (501) of a clip channel (510) is depicted in FIG. 56, FIG. 57, FIG. 58, and FIG. 59. The clip channel (510) may be formed into or embedded into another object or body such as the leash (50). FIG. 58 depicts the clip channel (510) embedded into the leash (50) near the handle section (55).

The clip channel (510) may comprise a channel wall portion (537) and a channel wall portion (538). The embedded version (501) may comprise the clip channel (510), and a base (505), and a body (503).

The clip channel (510) may be formed into the body (503). The channel wall portion (537) and the channel wall portion (538) may arise from edge portions of the body (503). The channel wall portion (537) and the channel wall portion (538) may narrowly separate so as to create the clip channel (510). The clip channel (510) may have an end of channel (529). The clip channel (510) may widen to form an opening into the clip channel (510), perhaps opposite the end of channel (529). The channel wall portion (537) and the channel wall portion (538) may diverge so as to create a channel guide (513) section and a channel guide (514) section. The channel guide (513) and the channel guide (514) may be curved and separated by a distance that may help facilitate sliding the bag (900) into the clip channel (510). A lateral opening (569) may be present along the length of the clip channel (510).

In this embodiment, the body (503) may be somewhat rectangular in shape. The body (503) may comprise a front of body (523), a back of body (524), a lateral portion of body (525), a lateral portion of body (526), an end of body (527), and an end of body (528).

The base (505) section may comprise the areas that help facilitate connection with another structure. In this embodiment, it may represent the areas adjacent to the securing holes (509). The base (505) may be attached to the leash (50) with the fasteners (51). It may utilize the one or more securing plates (12).

The embedded version (501) may be attached to another structure including, but is not limited to, the leash (50) via the overlay (15) type structure. The embedded version (501) may be attached to another structure including, but is not limited to, the leash (50) via an adhesive material that may be select by an ordinary person skilled in the art. The adhesive material may include various glues or adhesives.

The user may insert an object, such as, but is not limited to, the bag (900) into the clip channel (510) perhaps orienting the bag's (900) length parallel to the opening of the clip channel (510). The user may slide the bag (900) into the clip channel (510) to the end of channel (529) until the bag (900) is wedged in the clip channel (510). The user may grasp and hold the leash as the bag (900) may be secured and supported by the embedded version (501). The user may remove the bag (900) by sliding the bag (900) back out of the clip channel (510) towards the channel opening.

Alternative Embodiment: Clip (502)

Figure 61:
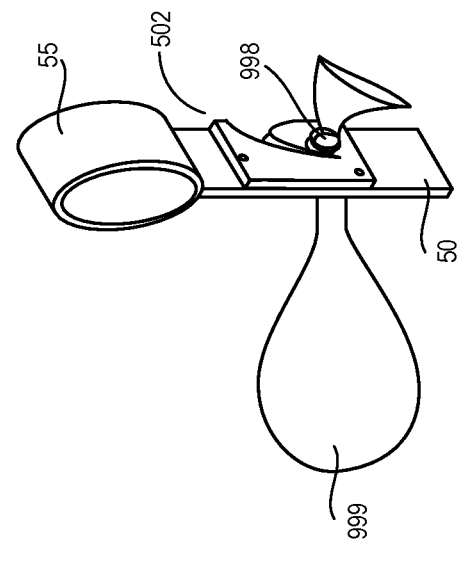
FIG. 61 depicts a front, top, and right view illustrating the embedded version (501) embodiment attached to the animal leash (50), according to an exemplary embodiment of the present invention. A waste filled bag (999) is depicted wedged into clip channel (560).
Figure 62:
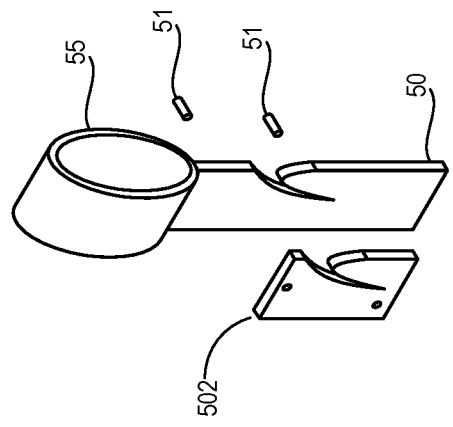
FIG. 62 depicts a font, top, and left view illustrating an exploded view of the embedded version (502), the animal leash (50), and the fasteners (51), according to an exemplary embodiment of the present invention.
Figure 60:
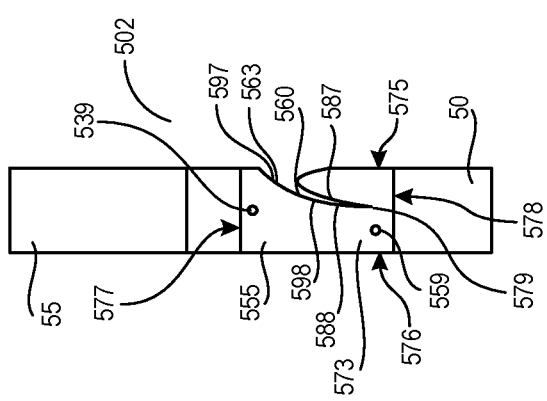
FIG. 60 depicts a front view illustrating an embedded version (502) embodiment attached to the animal leash (50), according to an exemplary embodiment of the present invention.

The clip (502) is depicted in FIG. 60, FIG. 61, and FIG. 62. The clip channel (560) may be embedded into another object or body, such as, but is not limited to, the leash (50).

FIG. 60 depicts the clip channel (560) embedded into the leash (50) near the handle section (55).

The clip channel (560) may be formed by a section of body (555). The clip channel (560) may comprise a first channel wall portion (587), and a second channel wall portion (588) formed by an edge of the body (555).

The channel wall portion (587) and the channel wall portion (588) may be narrowly separate so as to create the clip channel (560). The clip channel (560) may have an end of channel (579). The clip channel (560) may widen opposite the end of channel (579) to create a channel opening (597) near a lateral portion of body (575) or lateral portion of body (576).

Figure 63:
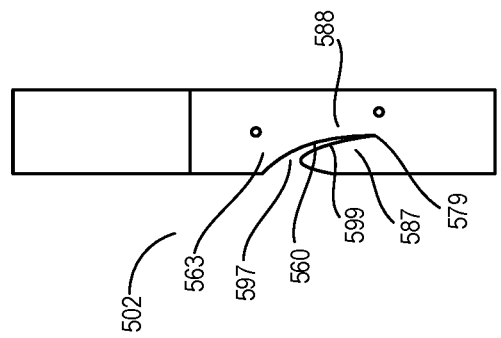
FIG. 63 depicts a back-view illustrating a clip channel (560), the animal leash (50), and the fasteners (51), according to an exemplary embodiment of the present invention.

The clip channel (560) may open laterally to the front or back portions of body (555). The opening to the front of body (573) is termed lateral opening (598). The opening to the back of body (574) is termed lateral opening (599). The lateral opening (599) is depicted in FIG. 63.

As depicted in FIG. 60, the channel wall portion (587) and the channel wall portion (588) may diverge so as to create one or more channel guide (563) sections near the opening. The channel guide (563) surfaces may be curved and separated by a distance that may help facilitate sliding the bag (900) into the clip channel (560).

In this embodiment, the body (555) may be rectangular in shape with a curved shaped relief extending from one or more edges into the central portion of the body (555). The body (555) may comprise the front of body (573), the back of body (574), the lateral portion of body (575), the lateral portion of body (576), an end of body (577), and an end of body (578). The body (555) may comprise one or more securing holes (559).

FIG. 62 illustrates an exploded view of the body (555), an embedded version (502), the leash (50), and the fasteners (51). The body (555) may be attached to the leash (50) with the fasteners (51). It may utilize one or more securing plate (562). The embodiment may be fastened to the leash (50) via the overlay (15). It may be attached or secured with a variety of adhesives or fasteners one skilled in the art may use to attach two bodies similar to these described.

The user may insert the bag (900) into the clip channel (560) perhaps orienting the bag's (900) length parallel to the width of the channel opening (597). The user may slide the bag (900) into and towards the end of channel (579) until the bag (900) is wedged in the clip channel (560). FIG. 61 depicts the waste filled bag (999) wedged into the clip channel (560)

The user may grasp and hold the leash (50). The bag (900) may be secured and supported by the embedded version (502). The user may remove the bag (900) by sliding the bag (900) back out of the clip channel (510) towards the channel opening.

Alternative Embodiment: Handle (600)

The handle (600) comprises the clip channel (610) formed by two or more channel wall portions. In this embodiment, the first and second channel wall portions are depicted in some illustrations as divided in half thus they are assigned different numerals for identification purposes. Though once formed, the individual halves may come together to form one or more walls that functions to form the clip channel (610). The clip channel (610) may be formed by a channel wall portion (637), a channel wall portion (601), a channel wall portion (638), and a channel wall portion (602). The primary function of the handle (600) is to support one or more waste filled bags (such as the waste filled bag (999)), one or more bags (such as the bag (900)), a ring, or cord.

In this embodiment, the clip channel (610) is formed into the handle of a dog leash. The handle (600) may comprise a handle housing (605) and a handle housing (606), with the clip channel (610) formed into each of the bodies.

The handle (600) housing may additionally house components of a retractable leash including, but not limited to, a spring or springs, leash materials such as cord or straps, real mechanism that rotates and may wind and spool the leash material, an aperture or hole to permit the cord or strap material to move in and out of the housing, a control or locking mechanism to govern the rotation of the real.

The channel wall portion (601), the channel wall portion (602), and an end of channel (629) arises from the handle housing (605), and and a first wall (641), a second wall (642), and an end of channel (649) arises from the handle housing (606).

Figure 64:
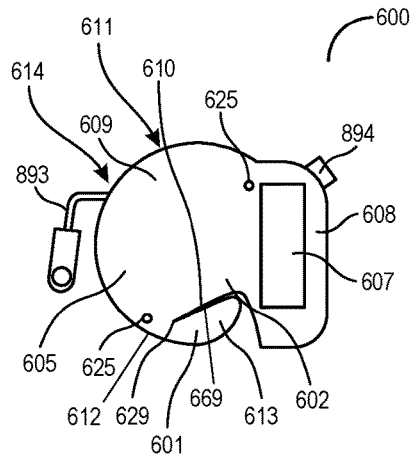
FIG. 64 depicts a left lateral view of a handle (600), according to an exemplary embodiment of the present invention.

While FIG. 64 depicts the clip channel (610) along the inferior or bottom portion of the handle (600), it could potentially be oriented and formed anywhere on the leash handle (600).

The handle housing (605) is depicted in FIG. 64. It is depicted as somewhat circularly shaped. It may have one or more relief (607) areas of sufficient size to permit a user's fingers to easily pass through. It may have a handle (608) portion of sufficient size that an adult hand could comfortably grasp the handle (608) portion. The overall dimensions of the handle (600) may be sufficient enough to accommodate components for a retractable leash.

Figure 65:
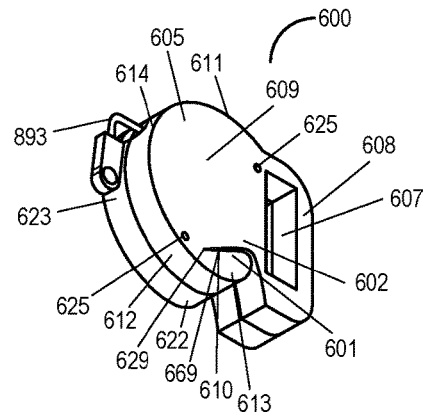
FIG. 65 depicts a bottom, front, and left view of the handle (600), according to an exemplary embodiment of the present invention.

The handle housing (605) is depicted in FIG. 65. The handle housing (605) may have an outer side (609), a top side (611), a bottom side (612), a front side (614), and inside (615). The handle housing (605) may have securing holes (625) that facilitate attaching with the other half of the handle (600) perhaps via the fasteners (51).

A semicircular hole may be present in the front side (614). Lateral opening (669) may be observed from a left lateral view, and may comprise the opening into the clip channel 610 from the left lateral side. The lateral opening (669) may extend the length of the clip channel (610). Lateral opening (670) may be observed from a right lateral view, and may comprise the opening into the clip channel 610 from the right lateral side. The lateral opening (670) may extend the length of the clip channel (610).

The opening to the clip channel (610) may be formed along the bottom side of the handle (600). The wall of the bottom side (612) may curve into the body of the handle housing (605) forming the wall of channel (601) and the wall of channel (602) of the clip channel (610). The clip channel (610) may be wider near the opening and taper narrowly towards the end of channel (629). The curved sections near the opening to the clip channel (610) are named the channel guides (613) as there curved tapering shape facilitates inserting a bag into the clip channel (610).

Figure 66:
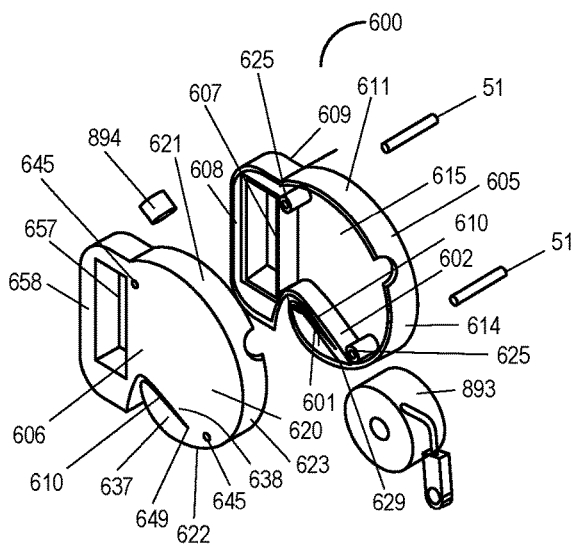
FIG. 66 depicts a top, front, and right view of the handle (600), according to an exemplary embodiment of the present invention.

The handle housing (606) is depicted in FIG. 66. It is depicted as somewhat circularly shaped. It may have one or more relief (657) areas of sufficient size to permit a user's fingers to easily pass through. It may have a handle (658) portion of sufficient size that an adult hand could comfortably grasp the handle (658) portion. The overall dimensions of the handle (600) may be sufficient enough to accommodate components for a retractable leash.

The handle housing (606) may have an outer side (620), a top side (621), a bottom side (622), a front side (623), and inside (624). The handle housing (606) may have securing holes (645) that facilitate attaching with the other half of the housing perhaps via the fasteners (51).

Figure 67:
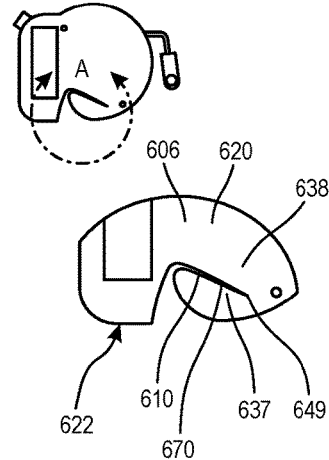
FIG. 67 depicts a detailed view of a clip channel (610), according to an exemplary embodiment of the present invention.

A semicircular hole may be present in the front side (623). The opening to the clip channel (610) may be formed along the bottom side of the handle (622). The wall of the bottom side (622) may curve into the body of the handle housing (606) forming the wall of channel (641) and the wall of channel (642) of the clip channel (610). The clip channel (610) may be wider near the opening and taper narrowly towards the end of channel (649). A detailed view of clip channel (610) is depicted in FIG. 67.

The handle housing (605) and the handle housing (606) may connect and attach perhaps via fasteners such as screws. One skilled in the art may attach the bodies in a variety of suitable fashions to uphold the function of the invention.

The clip channel (610) may be viewed from a lateral perspective as a curved channel originating on the bottom side (612) and curving a short distance into the handle housing (605).

The clip channel (610) could be oriented in a variety of other directions in relation to the handle (600). This is one embodiment of the invention. The invention being a narrow channel comprising an end portion, and two or more wall portions narrowly spaced so as to permit a small bag to be inserted and wedged into the channel, yet narrow enough that said bag could not easily slide out of the channel.

Alternative Embodiment: Clip (701)

The clip (701) is depicted in FIG. 89, FIG. 90, and FIG. 91. The clip (701) comprises a clip channel (710), as depicted in FIG. 90, and may comprise a curved body attached to the leash (50) via the fastener (51). An overlay, and adhesive, or a variety of other connecting methods and materials may just as well be employed. This is a much simplified version of the invention including a single body attached to another structure, in this example, the leash (50). A narrow space or clip channel (710) may be present between the body (703) and the leash (750). The space may be a narrow clip channel (710) comprising two or more channel wall portions, one arising from the leash (50) named the channel wall (758), and the other formed by the body (703) termed channel wall (757). It may also comprise an end of channel (729) portion. Channel wall (757) and channel wall (758) portions may be narrowly spaced so as to permit a small waste filled bag (999) to be inserted and wedged into the clip channel (710), yet narrow enough that said waste filled bag (999) could not easily slide out of the clip channel (710).

The body (703) may have a front, back, left, and right side. Additionally, it may have a first and second end portion. It may have a channel guide portion. It may be fabricated into the leash. It is not necessary to use the fasteners in all embodiments of this version or the invention.

The user may insert an object including, but not limited to, the waste filled bag (999) into the clip channel (710) until the bag is seated and secured in the clip channel (710). The user may let go of the waste filled bag (999) and hold onto the leash to control or walk with the animal. The clip (701) is depicted attached to the leash (50) in FIG. 91.

Alternative Embodiment: Clip (801)

The clip (801) is a variation of a clip channel (810) in which the channel is formed between two or more hook shaped bodies projecting in close proximity to one and other from a base portion. A top down view of the clip channel (810) is depicted in FIG. 88.

The clip (801) may be made of a variety of materials including, but are not limited to, hard durable plastics, thermoplastics, metals, and metal alloys. Additionally, it may be a combination of materials.

Figure 86:
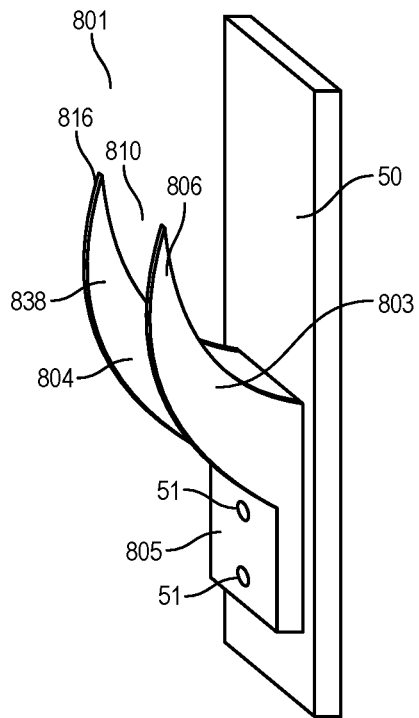
FIG. 86 depicts a front left view of a clip (801) attached to the animal leash (50), according to an exemplary embodiment of the present invention.
Figure 87:
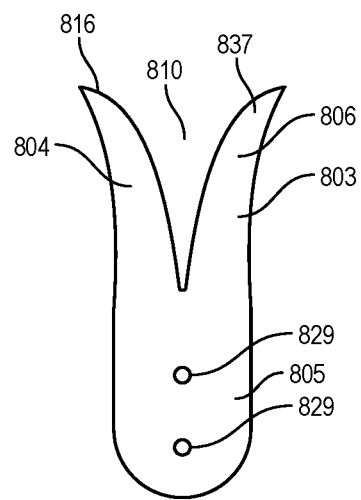
FIG. 87 depicts a front view of the clip (801), according to an exemplary embodiment of the present invention.
Figure 88:
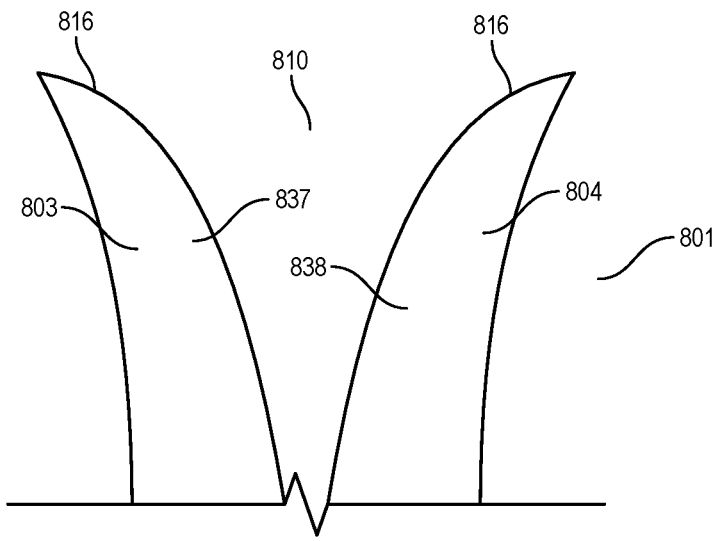
FIG. 88 depicts a top view of the clip (801), according to an exemplary embodiment of the present invention.

The clip (801) and the clip channel (810) are depicted in FIG. 86, FIG. 87, and FIG. 88. The clip channel (810) may be formed by a first pronged shaped body (803), and a second pronged shaped body (804) projecting laterally from a base (805). The body (803) and the body (804) may curve along their length sharing a similar curvature. The body (803) and the body (804) may be spaced in close proximity so as to create a narrow clip channel (810) between them.

The body (803) may have an end (806) portion, and a channel wall (837) portion facing and partially forming the clip channel (810). The clip channel (810) is depicted in FIG. 87. The body (804) may have an end (816) portion, and a channel wall (838) portion facing and partially forming the clip channel (810). End (806) and end (816) may flare apart and increase in distance of separation near the opening of the clip channel (810).

The base (805) may be rectangular in shape. It may include securing holes (829) in which the fasteners (51) may pass and assist with securing the clip (801) to another item such as the leash (50), handle, harness, or pooper scooper. The base (805) is depicted in FIG. 86.

The user may insert a knotted waste filled bag (999) into the clip channel (810) until the bag (900) is seated and secured in the clip channel (810). The clip (801) and the clip channel (810) may be attached to the leash (50). The secured waste filled bag (999) may be secured in the clip channel (810) and suspended from the leash (50) and transported with the user and animal.

Alternative Embodiment: Clip (901)

This embodiment describes and depicts a clip (901) and a clip channel (910) formed as part of a tube-shaped body similar to a tube-shaped body, such as, but not limited to, a pet waste bag dispenser. This embodiment of clip (901) describes and depicts how the clip channel could be incorporated and engineered into a pet waste bag dispenser.

The clip (901) and a tube (905) may be made of a variety of materials including, but are not limited to, hard durable plastics, thermoplastics, metals, and metal alloys. Additionally, it may be a combination of materials.

Figure 81:
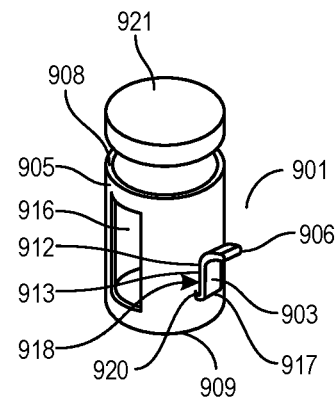
FIG. 81 depicts a top, right, and front view of the clip (901), according to an exemplary embodiment of the present invention.

The clip channel (910) is depicted in FIG. 81 as being formed by the tube (905) with a body (903) projecting from its side wall. The clip channel (910) is formed between a channel wall (912) and a channel wall (913) of the tube (905) and the body (903). The clip channel (910) comprises an end of channel (904).

Figure 82:
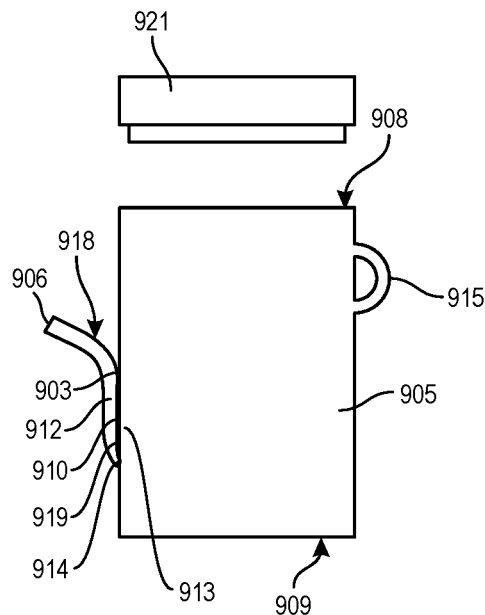
FIG. 82 depicts a left lateral view of the clip (901), according to an exemplary embodiment of the present invention.
Figure 83:
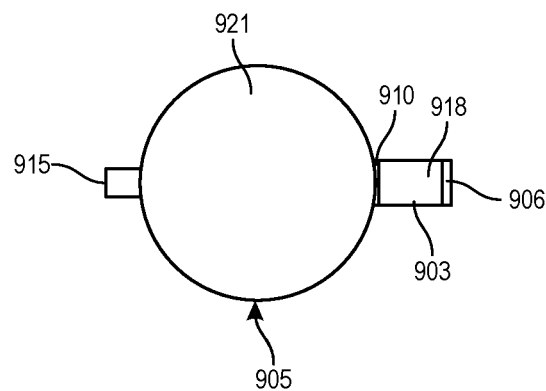
FIG. 83 depicts a top view of the clip (901), according to an exemplary embodiment of the present invention.

The tube (905) is depicted in FIG. 82 as an elongated tube shaped body. The tube (905) may have a first end (908) and a second end (909) section. The tube (905) may have an inner and outer surface. The first end (908) section may be opened or closed. The second end (909) section may be opened or closed. The first end (908) section may have a cap such as a push or screw cap to selectively open and close the first end (908). The second end (909) may have a cap (921), such as a push or screw cap (921), to selectively open and close the second end (909). A top view of the cap (921) is depicted in FIG. 83.

There may be an opening (916) through the wall of the tube (905), as depicted in FIG. 81. Any portion of the tube (905) may form the channel wall (913). In this embodiment, the outer surface of the tube (905) forms the channel wall (913) that partially forms the clip channel (910).

A semicircular ring (915) may project laterally from the tube (905). The ring (915) may facilitate connecting to the leash (50), perhaps via a connector such as a carabiner or key ring.

Figure 80:
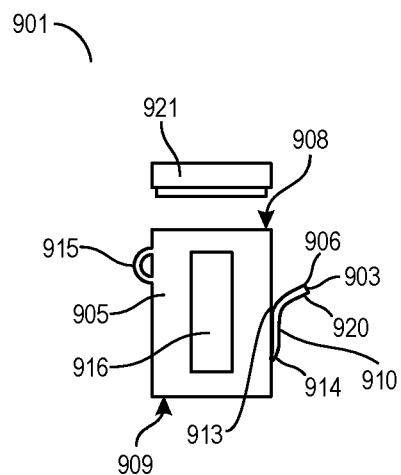
FIG. 80 depicts a right lateral view of a clip (901), according to an exemplary embodiment of the present invention.

The body (903) is depicted in FIG. 80. The body (903) may extend from the tube (905) as a flat elongated body perhaps somewhat rectangular in shape, though it could be cylindrical. The body (903) may extend along the length of the tube (905) in close proximity to the outer surface of the tube (905). The body (903) may have the channel wall (912) portion that generally faces the tube (905) and in part forms the clip channel (910). The body (903) may have an end (906) that may flare or curve away from the tube (905). The body (903) may have a front (917), a back (918), lateral side (919), and a lateral side (920) sections.

An end of channel (914) may be present near the junction of the body (903) with the tube (905). The clip channel (910) may be formed between the body (903) and the tube (905) specifically the channel wall (912) and the channel wall (913).

The user may insert an object including, but not limited to, a knotted waste filled bag (999), into the clip channel (910) until the bag is seated and secured in the clip channel (910). The tube (905) may be joined to the leash (50), perhaps but not limited to via a carabiner, hook, ring, or clasp. The tube (905), the clip (901), and the clip channel (910) with the secured waste filled bag (999) may be suspended from the leash (50) and transported with the user.

Other Combinations and Ways the Clip Could Be Attached

The clip (1), the hinge clip (101), the living hinge clip (201), the clip (801), the clip (701), the split body (301), and the bulky body (401) embodiments of the clip channel may be attached to the retractable leash (889). They may be attached, connected, or formed into any component of a leash or retractable leash. One depiction of the clip (1) attached to the lateral side of the retractable leash (889) is depicted in FIG. 68. A back view of the hinge clip (101) attached to the retractable leash (889) is depicted in FIG. 69. A front view of the clip (1) attached to the retractable leash (889) as depicted in FIG. 70. This view also depicts the clip channel (10). FIG. 71 illustrates an exploded view of the retractable leash (889) with the clip (1) attached. The various embodiments of the clip channel could be formed with the retractable leash (889) housing or could be attached via fasteners, adhesives, clips, or any variety of fastening methods.

FIG. 76, FIG. 77, FIG. 78, and FIG. 79 depict how a clip could be formed into or attached to a retractable leash. In this embodiment, the clip (18) forms the clip channel (19) between itself and the body of the retractable leash (889). The clip channel (19) may be of similar features and functions as the clip channel (10), as the clip (18) may share similar features and functions as the clip (1). Its primary function is to secure the waste filled bag (999). Other embodiments of the invention including, but not limited to, the clip (1), the hinge clip (101), the living hinge clip (201), the clip (801), the clip (701), the split body (301), and the bulky body (401) could be fashioned to or built into the retractable leash (889). They may be formed into the body of the retractable leash (889) or attached to it. Perhaps they may be attached via fasteners, adhesives, clips, or other comparable methods and materials could be employed.

The clip (1), the hinge clip (101), the living hinge clip (201), the clip (801), and the split body (301) embodiments of the hinge channel could be attached to a section of tube of variable diameter. The clip (1), the hinge clip (101), the living hinge clip (201), the clip (801), and the split body (301) could be attached to a dog harness or similarly to dog clothing via various forms of the fasteners (51), or the overlay (15) as previously described.

FIG. 93 depicts a left lateral view of the clip (1) attached to the dog harness (11) with the overlay (15). The dog harness (11) is attached to the dog (57). The waste filled bag (999) is supported by the clip (1). The leash (50) is attached to the dog harness (11). The dog harness (11) is depicted individually in FIG. 92.

The clip (71) and the clip channel (70) disclosed here could be formed into a pooper scooper device (75), perhaps into the handle portion, though it could be formed into the scoop section, or tube section as well. The primary function of the clip (71) and the clip channel (70) is to assist with transporting of the waste filled bag (999).

Figure 94:
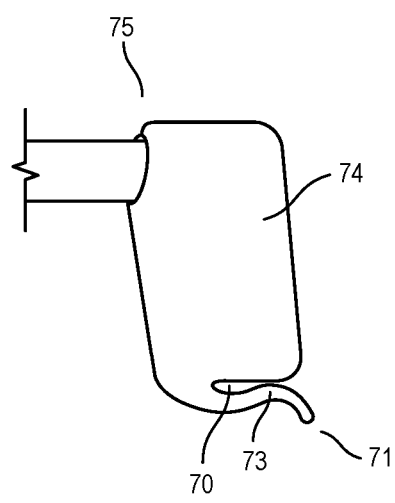
FIG. 94 depicts a left lateral view of a handle (74) section of a pooper scooper (75) device, according to an exemplary embodiment of the present invention. Clip (71) is formed into the handle (74). Clip channel (70) is formed between body (73) and handle (74).

The clip (71) is depicted in FIG. 94 formed into the handle (74) portion of pooper scooper (75). The clip channel (70) may be formed between the body (73) and the handle (74). The clip (71) may share similar features and function as the clip (1) except that it is formed into the handle (74) of the pooper scooper (75). The clip channel (70) may share similar function as the clip channel (10) but it is formed by the body (73) and the handle (74). The function of the clip 71 and the clip channel (70) are to assist with securing the waste filled bag (999) for transportation.

Figure 95:
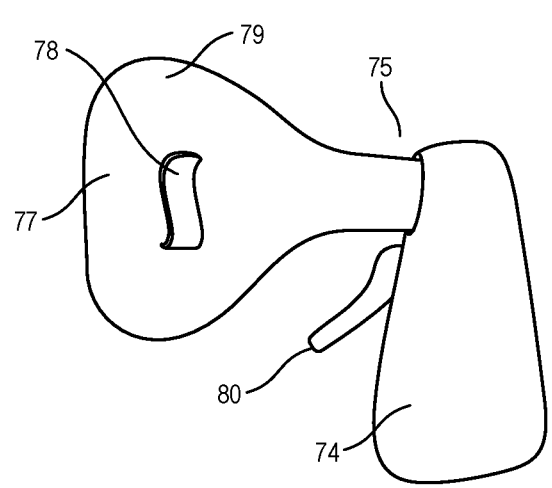
FIG. 95 depicts a left lateral view of the pooper scooper (75), according to an exemplary embodiment of the present invention. Clip (77) is formed into the scoop (79) section of the device. A clip channel (81) is formed between scoop (79) and body (78).

The clip (77) is depicted in FIG. 95. The clip (77) comprises a curved body (78) projecting from the lateral surface of scoop (79) section of the pooper scooper (75) device. The body (78) may comprise an end, a front, back, first lateral, and second lateral side. Trigger (80) was added for illustrative purposes as the pooper scooper (75) may have a similar trigger. A clip channel (81) is formed between the body (78) and the scoop (79). The function of the clip (77) and the clip channel (81) are to assist with securing the waste filled bag (999) for transportation.

Figure 72:
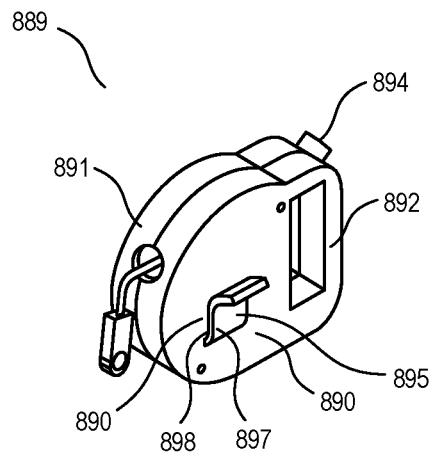
FIG. 72 depicts a front, top, and left view of a clip channel (898) formed into the retractable leash (889), according to an exemplary embodiment of the present invention.

The Retractable leash (889) may be similar in feature and function to those commonly used and sold for walking dogs. The retractable leash (889) may comprise a handle housing (890), a handle housing (891), a handle portion (892), a leash portion (893), and a lock mechanism (894). It may include any version of clip presented here. It is depicted in FIG. 72 with body projecting from its side similar in shape and function to the body (3) of the clip (1).

The handle retractable leash (889) housing may additionally house components of a retractable leash including, but not limited to, a spring or springs, leash materials such as cord or straps, real mechanism that rotates, and may wind and spool the leash material, an aperture or hole to permit the cord or strap material to move in and out of the housing, and a control or locking mechanism to govern the rotation of the real.

Figure 73:
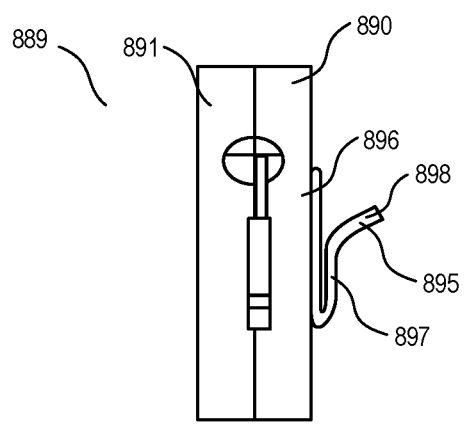
FIG. 73 depicts a front view of the clip channel (898) formed into retractable leash (889), according to an exemplary embodiment of the present invention.

Each of the handle housings may comprise a front, back, inside, outside, top, and bottom sections. The handle retractable leash (889) is depicted in FIG. 73 with a curved body (895) extending laterally from the handle housing (890). Handle housing comprises a channel wall (896). The body (895) comprises a front, back, right, and left lateral positions. The body (895) also comprises a channel wall (897) on the back portion. The body (895) is depicted in FIG. 72.

Figure 74:
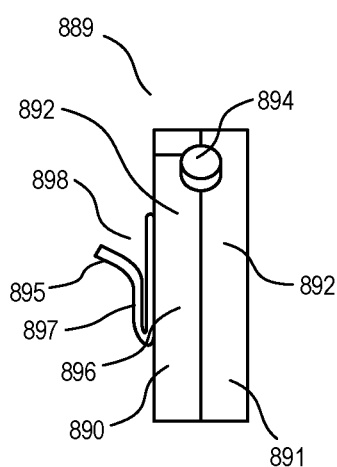
FIG. 74 depicts a back view of the clip channel (898) formed into the retractable leash (889), according to an exemplary embodiment of the present invention.
Figure 75:
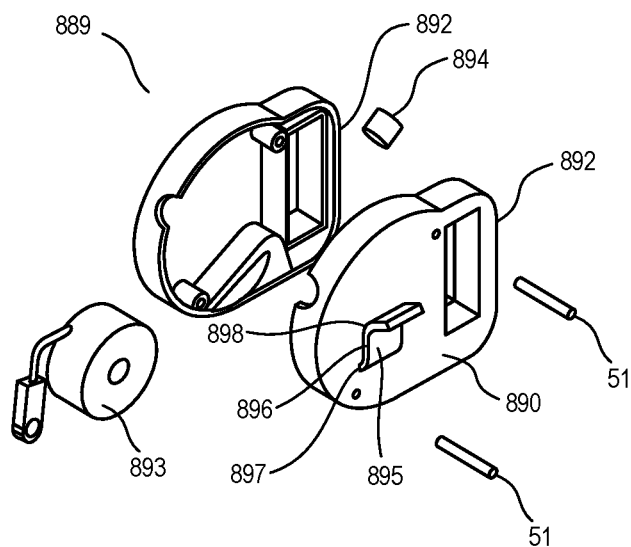
FIG. 75 depicts a top, front, and left exploded view of the clip channel (898) formed into the retractable leash (889), according to an exemplary embodiment of the present invention.

The channel wall (896) and the channel wall (897) form the clip channel (898). The clip channel (898) is depicted in FIG. 73 and FIG. 74. An exploded view of the retractable leash (889) is depicted in FIG. 75. It may be connected with the fasteners (51). The retractable leash (889) functions similar to previous embodiments with bag insertion and extraction from the clip channel (898).

Alternative Embodiment: Clip (91)

Figure 97:
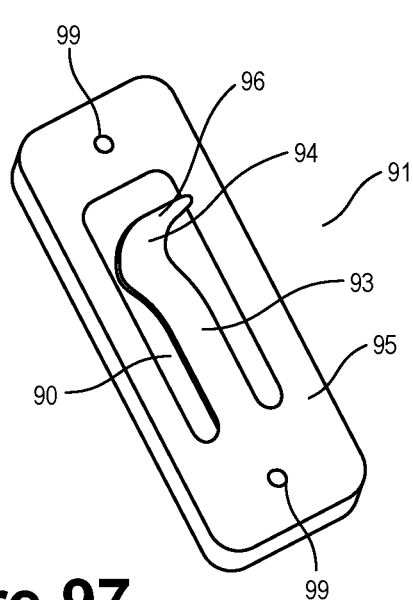
FIG. 97 depicts a front and right view of a clip (91), according to an exemplary embodiment of the present invention.

The clip (91) is depicted in FIG. 97. The clip (91) comprises a clip channel (90), a body (93), and a base (95). The body (93) may comprise a front and back side, a first lateral side, and a second lateral side. The body (93) may be rectangular in shape. It may have two ends. It may transition to form a channel guide (94) at one of its ends. At the other end, it may transition into the base (95).

The channel guide (94) is a curved section that generally curves away from the front of base. The channel guide (94) may facilitate with sliding the bag (900) into the clip channel (90). The channel guide (94) may terminate in an end (96).

Figure 99:
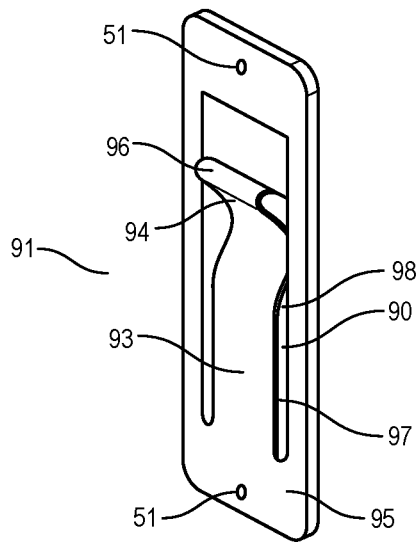
FIG. 99 depicts a front, top, and left view of the clip (91) and a clip channel (90), according to an exemplary embodiment of the present invention.

The back of body may include a channel wall (97). The channel wall (97) faces a void, however when the clip (91) is attached to another device, such as, but is not limited to, the leash (50), that next device will form channel wall (98) and partially form the clip channel (90). In this embodiment, in FIG. 99, the clip (91) is depicted attached to the leash (50) which comprises the channel wall (98).

The base (95) may comprise a front, back, first lateral, and second lateral sides, as well as a top, and bottom section. The body (93) is formed central to the base (95) and is partially surrounded by a relief or void space. The base (95) may comprise securing holes (99).

Figure 98:
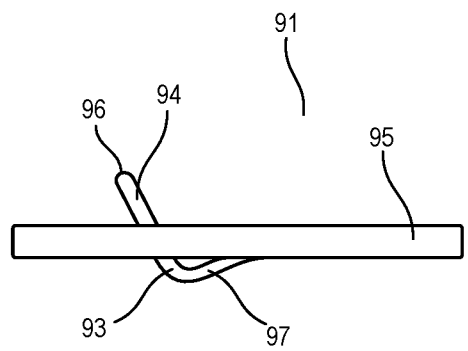
FIG. 98 depicts a left lateral view of the clip (91), according to an exemplary embodiment of the present invention.

FIG. 98 depicts a left lateral view of the clip (91). The back portion of body (93) is illustrated extending beyond the back portion of the base (95).

Figure 100:
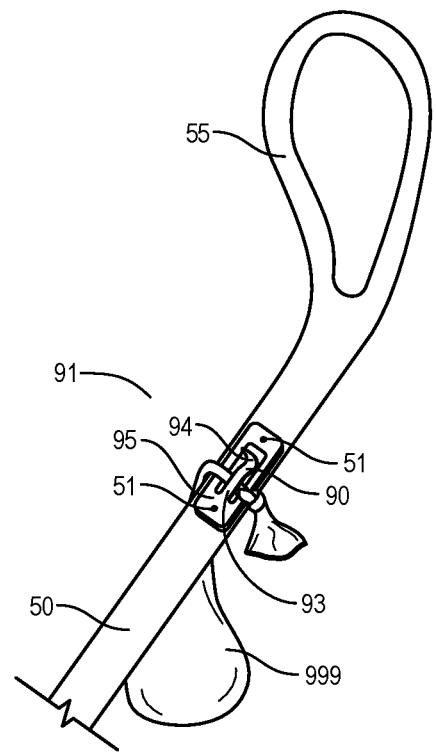
FIG. 100 depicts a front left view of the clip (91) attached to the animal leash (50), and the waste filled bag (999) is depicted hanging from the clip (91), according to an exemplary embodiment of the present invention.

FIG. 100 depicts a front left view of the clip (91) attached to the leash (50), the waste filled bag (999) is depicted hanging from the clip (91).

In summary what is invented here is a clip channel that is engineered to easily hold and retain a waste filled bag. The clip channel can be attached to or formed with a variety of animal handling related accessories including, but are not limited to, leashes, retractable leashes, pet harnesses, bag dispensers, and pooper scooper devices. The clip channel may be created as a solitary item such as a clip or made into another device.

While the invention has been described in connection with what is presently considered to be the most practical and preferred embodiments, it is to be understood that the invention is not to be limited to the disclosed embodiments, but, on the contrary, is intended to cover various modifications and equivalent arrangements included within the spirit and scope of the appended claims.

What is claimed is:

1. An embedded clip channel of a clip for a pet waste bag, comprising:
    a clip channel formed by a plurality of channel walls comprising at least a first channel wall and a second channel wall,
        wherein an internal separation distance between the plurality of channel walls is used to permit the pet waste bag to be inserted into the clip channel;
    a body comprising an elongated portion extending between a base-to-body transition zone and a channel guide portion of the clip,
        wherein the body transitions into the channel guide towards a terminal end of the clip; and
    a base for facilitating connection with an apparatus,
        wherein the channel guide curves away from the base so as to create a wider opening into the clip channel that is used for inserting the pet waste bag into the clip channel,
        wherein the base is added with one or more securing areas that permits the clip to be secured to the apparatus, and
        wherein an overlay is provided with the clip for attaching the clip to the apparatus.

2. The embedded clip channel of claim 1, wherein the channel guide comprises a curved section that curves away from the clip channel and the base.

3. The embedded clip channel of claim 1, wherein the body or the base is integrated into at least one of the plurality of channel walls.

4. The embedded clip channel of claim 1, wherein the base comprises a front portion, a back portion, a left lateral portion, a right lateral portion, a first end portion, and a second end portion, and
    wherein the back portion of the base comprises one or more securing holes near at least one of the first end portion and the second end portion, wherein the one or more securing holes permit securing a fastener to or through them.

5. The embedded clip channel of claim 4, wherein a size of the body is different from a size of the base, and
    wherein the body and the base are in motion relative to each other, wherein the motion corresponds to at least a rotation motion.

6. The embedded clip channel of claim 1, wherein the body comprises a first lateral portion, a second lateral portion, a back portion, and a front portion, and
    wherein the back portion of the body forms one of the plurality channel walls that partially forms a boundary of the clip channel.

7. The embedded clip channel of claim 1, wherein each securing area comprises one or more raised portions near a first end of the base and a second end of the base, and
    wherein each securing area facilitates channeling the strap for wrapping around the clip and the apparatus comprising at least a leash.

8. The embedded clip channel of claim 1, wherein the overlay comprises an overlay body including one or more overlay relief, and
    wherein the overlay body is formed by a portion of the apparatus to which it is attaching.

9. The embedded clip channel of claim 8, wherein the overlay relief is a hole or a relief area in the overlay body of a sufficient size such that the body of the clip is inserted and permitted to pass through it and the base is restricted to pass through it.

10. The embedded clip channel of claim 8, wherein the overlay is made of one or more materials including at least fabric like materials and textiles, such as nylon straps or rope, as well as plastics such as thermoplastics, or metals.

11. The embedded clip channel of claim 1, wherein an embedded version of the clip channel comprises embedding the clip channel into the apparatus comprising at least a leash, and
    wherein the clip channel is embedded near a handle section of the apparatus.

12. The embedded clip channel of claim 11, wherein the clip channel is embedded into the apparatus via the overlay or by using an adhesive material including at least glues or adhesives.

13. The embedded clip channel of claim 1, wherein the clip corresponds to a living hinge clip in which the body and the base are connected via a living hinge to form a hinge channel, and
    wherein the living hinge comprises a curved section extending from the base to the body, wherein the living hinge is curved convexly or concavely on the clip channel.

14. The embedded clip channel of claim 1, wherein the clip corresponds to a hinge clip that comprises a hinge component in addition to the body and the base, and
    wherein the hinge component comprises a combination of one or more hinge leaf, hinge leaf, hinge knuckle, hinge knuckle, hinge pin, and hinge spring.

15. The embedded clip channel of claim 1, wherein the clip channel is formed into or attached to the apparatus comprising at least a leash, a leash handle, a retractable leash, a waste bag dispenser, an animal harness, or a poop scooper device.

16. The embedded clip channel of claim 15, wherein the leash is made of one or more materials including at least nylon or polyester straps or ropes, thin cord, plastic or metal chain, and cable, and wherein the leash is round or rectangular in cross: sectional shape.

17. The embedded clip channel of claim 16, wherein the leash includes a first end that terminates in the leash handle, wherein the leash handle is a loop formed by the same material as a body of the leash, and a second end of the leash is attached to a hook or clasp to facilitate connecting to a pet collar of a pet animal.

18. An embedded clip channel of a clip for a pet waste bag, comprising:
    a clip channel formed by a plurality of channel walls comprising at least a first channel wall and a second channel wall,
        wherein an internal separation distance between the plurality of channel walls is used to permit the pet waste bag to be inserted into the clip channel;
    a body comprising an elongated portion extending between a base-to-body transition zone and a channel guide portion of the clip,
        wherein the body transitions into the channel guide towards a terminal end of the clip; and
    a base for facilitating connection with an apparatus,
        wherein the channel guide curves away from the base so as to create a wider opening into the clip channel that is used for inserting the pet waste bag into the clip channel,
        wherein the base is added with one or more securing areas that permits the clip to be secured to the apparatus, and
        wherein the channel guide comprises a curved section that curves away from the clip channel and the base.

19. An embedded clip channel of a clip for a pet waste bag, comprising:
    a clip channel formed by a plurality of channel walls comprising at least a first channel wall and a second channel wall,
        wherein an internal separation distance between the plurality of channel walls is used to permit the pet waste bag to be inserted into the clip channel;
    a body comprising an elongated portion extending between a base-to-body transition zone and a channel guide portion of the clip,
        wherein the body transitions into the channel guide towards a terminal end of the clip; and
    a base for facilitating connection with an apparatus,
        wherein the channel guide curves away from the base so as to create a wider opening into the clip channel that is used for inserting the pet waste bag into the clip channel,
        wherein the base is added with one or more securing areas that permits the clip to be secured to the apparatus,
        wherein each securing area comprises one or more raised portions near a first end of the base and a second end of the base, and
        wherein each securing area facilitates channeling the strap for wrapping around the clip and the apparatus comprising at least a leash.

* * * * *